US012044999B2

(12) United States Patent
Kato et al.

(10) Patent No.: US 12,044,999 B2
(45) Date of Patent: Jul. 23, 2024

(54) IMAGE FORMING APPARATUS AND METHOD FOR CONTROLLING THE SAME

(71) Applicant: BROTHER KOGYO KABUSHIKI KAISHA, Nagoya (JP)

(72) Inventors: Sadaharu Kato, Kariya (JP); Kazuna Taguchi, Nagoya (JP); Mingguang Zhang, Nagoya (JP); Shunsuke Ueki, Nagoya (JP); Shintaro Sakaguchi, Nagoya (JP); Yusuke Mizuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 146 days.

(21) Appl. No.: 17/509,125

(22) Filed: Oct. 25, 2021

(65) Prior Publication Data

US 2022/0128941 A1 Apr. 28, 2022

(30) Foreign Application Priority Data

Oct. 28, 2020 (JP) ................................ 2020-180273

(51) Int. Cl.
*G03G 15/00* (2006.01)
*G03G 15/20* (2006.01)

(52) U.S. Cl.
CPC ......... *G03G 15/70* (2013.01); *G03G 15/2053* (2013.01)

(58) Field of Classification Search
CPC ........................... G03G 15/70; G03G 15/2053
See application file for complete search history.

(56) References Cited

U.S. PATENT DOCUMENTS 6,007,062 A 12/1999 Choo et al.
2002/0031358 A1* 3/2002 Yoshikawa ............ G03G 15/70 399/18
2007/0189786 A1 8/2007 Aoki et al.
2008/0131161 A1* 6/2008 Kikuchi ............ G03G 15/2039 399/329

(Continued)

FOREIGN PATENT DOCUMENTS

JP 10-67447 A 3/1998
JP 11-65350 A 3/1999

(Continued)

OTHER PUBLICATIONS

Office Action issued in corresponding Japanese Patent Application No. 2020-180273, May 14, 2024.

*Primary Examiner* — David H Banh
(74) *Attorney, Agent, or Firm* — Merchant & Gould P.C.

(57) ABSTRACT

An image forming apparatus includes a first fixing member, a second fixing member, a heater, a switching mechanism capable of switching a nip state of the first fixing member and the second fixing member between (i) a first nip state in which the belt is nipped between each of the first nip forming member and the second nip forming member, and the first fixing member, and (ii) a second nip state in which the belt is nipped between the first nip forming member and the first fixing member in a state in which the belt is not nipped between the second nip forming member and the first fixing member, and a controller configured to switch the nip state from the first nip state to the second nip state when a jam error occurs in the first nip state.

17 Claims, 11 Drawing Sheets

(56) References Cited

U.S. PATENT DOCUMENTS

| | | | | |
|---|---|---|---|---|
| 2008/0240809 | A1* | 10/2008 | Takahashi | G03G 15/2064 399/329 |
| 2009/0035034 | A1* | 2/2009 | Nagase | G03G 15/2025 399/329 |
| 2011/0026988 | A1* | 2/2011 | Yoshikawa | G03G 15/2053 399/329 |
| 2011/0217057 | A1* | 9/2011 | Yoshinaga | G03G 21/20 399/329 |
| 2011/0318073 | A1* | 12/2011 | Arikawa | G03G 15/206 399/329 |
| 2015/0266314 | A1* | 9/2015 | Toia | B41J 11/006 347/104 |
| 2016/0274518 | A1 | 9/2016 | Akatsuka et al. | |
| 2017/0205743 | A1 | 7/2017 | Kamiya et al. | |
| 2018/0107142 | A1* | 4/2018 | Samei | G03G 15/206 |
| 2018/0033571 | A1 | 11/2018 | Chikugo | |
| 2018/0335718 | A1* | 11/2018 | Chikugo | G03G 15/607 |
| 2019/0235422 | A1* | 8/2019 | Yabuki | G03G 15/2053 |

FOREIGN PATENT DOCUMENTS

| | | | |
|---|---|---|---|
| JP | 2000-200010 | A | 7/2000 |
| JP | 2001-318544 | A | 11/2001 |
| JP | 2002-156868 | A | 5/2002 |
| JP | 2002-252074 | A | 9/2002 |
| JP | 2003-140488 | A | 5/2003 |
| JP | 2005-181508 | A | 7/2005 |
| JP | 2006-240783 | A | 9/2006 |
| JP | 2007-219007 | A | 8/2007 |
| JP | 2010-204485 | A | 9/2010 |
| JP | 2011-133502 | A | 7/2011 |
| JP | 2012-8394 | A | 1/2012 |
| JP | 2015-36743 | A | 2/2015 |
| JP | 2016-177041 | A | 10/2016 |
| JP | 2017-125969 | A | 7/2017 |
| JP | 2018-197851 | A | 12/2018 |

* cited by examiner

IMAGE FORMING APPARATUS AND METHOD FOR CONTROLLING THE SAME

CROSS REFERENCE TO RELATED APPLICATION

The present application claims priority from Japanese Patent Application No. 2020-180273, which was filed on Oct. 28, 2020, the disclosure of which is herein incorporated by reference in its entirety.

BACKGROUND

The following disclosure relates to an image forming apparatus including a fixing device and a method for controlling the image forming apparatus.

There has been known a fixing device for an image forming apparatus including a heating roller, an endless belt, a rigid member and an elastic member, and the belt is nipped between each of the rigid member and the elastic member, and the heating roller. In this technique, the rigid member and the elastic member are pressed onto the heating roller to thereby form a nip portion when printing paper other than an envelope. When printing the envelope, the rigid member is spaced apart from the heating roller and only the elastic member is pressed onto the heating roller to thereby form the nip portion.

SUMMARY

However, if an error in which paper stops between the heating roller and the belt occurs while printing paper other than the envelope in the related-art technique, there occurs a problem that it is difficult to pull out the paper, since pressure is applied to the paper from both the rigid member and the elastic member.

In view of the above, an aspect of the disclosure relates to an image forming apparatus capable of pulling out a sheet easily from between a roller and two members even in a case where an error in which the sheet stops occurs while executing printing in a state in which the sheet is nipped between the roller and the two members.

In one aspect of the disclosure, an image forming apparatus includes a first fixing member having a roller, a second fixing member including a belt, a first nip forming member and a second nip forming member, the belt being nipped between the first fixing member and the second fixing member, a heater configured to heat the first fixing member, a switching mechanism capable of switching a nip state of the first fixing member and the second fixing member between (i) a first nip state in which the belt is nipped between each of the first nip forming member and the second nip forming member, and the first fixing member, and (ii) a second nip state in which the belt is nipped between the first nip forming member and the first fixing member in a state in which the belt is not nipped between the second nip forming member and the first fixing member, and a controller configured to switch the nip state from the first nip state to the second nip state when a jam error occurs in the first nip state, the jam error being an error in which the sheet stops while image forming.

In another aspect of the disclosure, an image forming apparatus includes a fixing roller, a belt, a first pad, a second pad, a heater configured to heat the first fixing roller, a switching mechanism capable of switching a nip state between (i) a first nip state in which the first pad and the second pad urge the belt toward the fixing roller, and (ii) a second nip state in which the first pad urges the belt toward the fixing roller, and the second pad does not urge the belt toward the fixing roller, a controller configured to switch the nip state from the first nip state to the second nip state when a jam error occurs in the first nip state, the jam error being an error in which the sheet stops while image forming.

In another aspect of the disclosure, a method for controlling an image forming apparatus which includes a first fixing member, a belt, a first nip forming member configured to cooperate with the first fixing member to nip the belt therebetween, a second nip forming member configured to cooperate with the first fixing member to nip the belt therebetween, a heater configured to heat the first fixing member, a nip state being switched between (a) a first nip state in which the belt is nipped between each of the first nip forming member and the second nip forming member, and the first fixing member, and (ii) a second nip state in which the belt is nipped between the first nip forming member and the first fixing member in a state in which the belt is not nipped between the second nip forming member and the first fixing member includes switching the nip state from the first nip state to the second nip state when a jam error occurs in the first nip state, the jam error being an error in which the sheet stops while image forming.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Next, an embodiment of the present disclosure will be explained in detail suitably with reference to the drawings.

Figure 1:
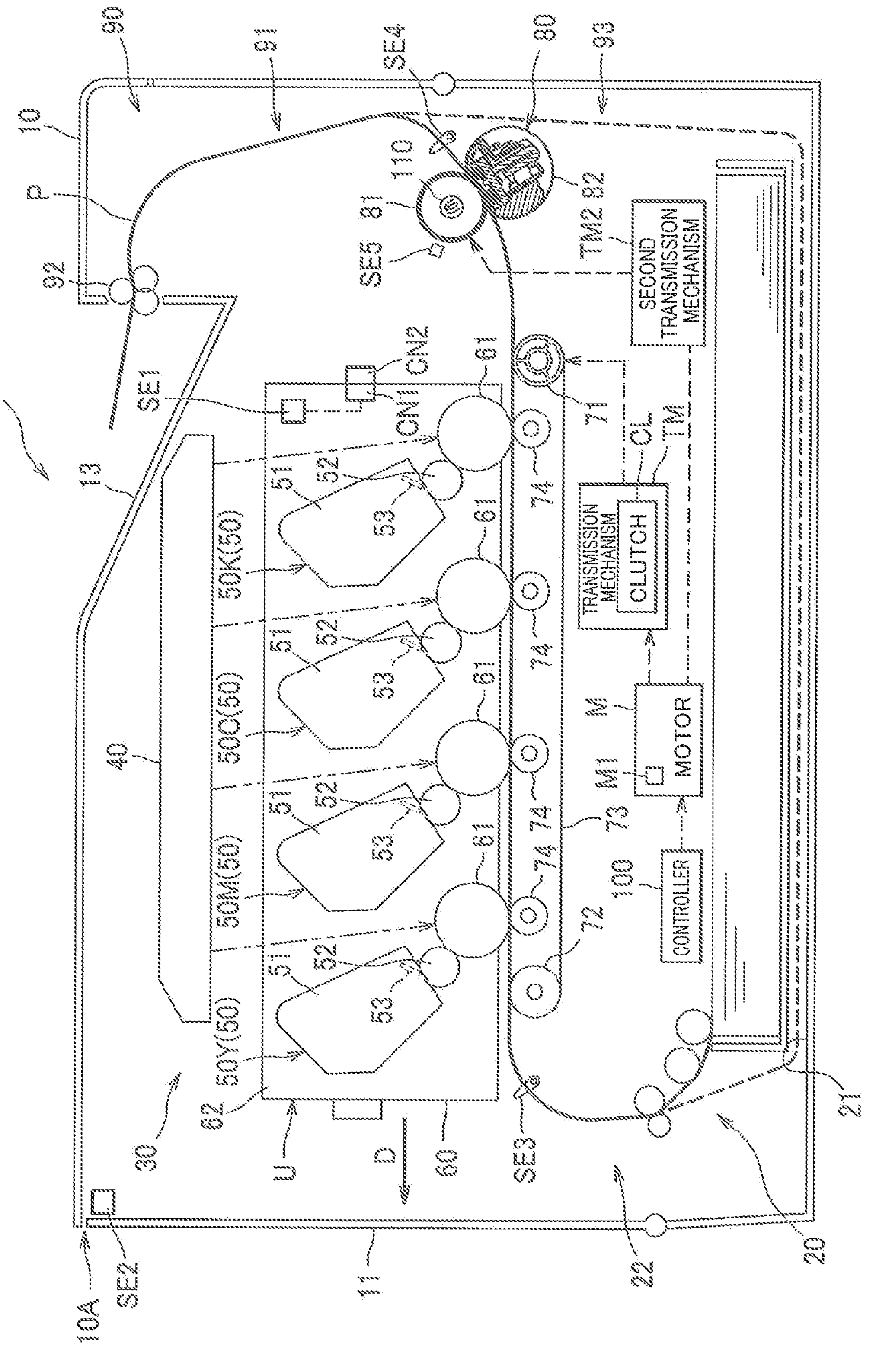
FIG. 1 is a cross-sectional view illustrating a color printer according to an embodiment of the present disclosure.

As illustrated in FIG. 1, a color printer 1 as an example of an image forming apparatus includes a body housing 10, a supplier 20 supplying a sheet P, an image forming portion 30 configured to form an image on the sheet P, a conveying portion 90 configured to discharge the sheet P on which the image is formed, and a controller 100.

The body housing 10 includes an opening 10A and a cover 11 configured to open and close the opening 10A. The opening 10A is an opening through which a later-described unit U can pass. The cover 11 is pivotable between an open position at which the opening 10A is opened and a closed position at which the opening 10A is closed.

The supplier 20 includes a supply tray 21 containing the sheet P and a sheet conveying mechanism 22 configured to convey the sheet P from the supply tray 21 to the image forming portion 30.

The image forming portion 30 includes a scanner unit 40, a unit U, a transfer unit 70, and a fixing device 80. The scanner unit 40, the unit U, and the transfer unit 70 correspond to a developer image forming portion that forms a developer image on the sheet P.

The scanner unit 40 includes a not-illustrated laser emitting portion, a polygon minor, a lens, a reflection minor, and so on. The scanner unit 40 irradiates a laser beam on surfaces of each of photoconductor drums 61.

The unit U can be drawn out from the body housing 10 through the opening 10A. The unit U includes four cartridges 50 and a drawer 60.

The cartridges 50 are mountable and removable to and from the drawer 60. Each cartridge 50 includes a container 51 containing toner as an example of a developer, a developing roller 52, and a layer-thickness limiting blade 53 configured to limit a layer thickness of toner on the developing roller 52 by contacting the developing roller 52. The containers 51 of four cartridges 50 contain toner of respective colors which are yellow, magenta, cyan, and black.

The cartridges 50 illustrated with symbols 50Y, 50M, 50C, and 50K containing toner of respective colors which are yellow, magenta, cyan, and black are disposed to be arranged in this order from upstream in a conveying direction of the sheet P.

The drawer 60 is capable of being drawn out from an image forming position of the body housing 10 in a direction orthogonal to a vertical direction. Here, the image forming position means a position of the drawer 60 at the time when forming an image. The drawer 60 includes a frame 62 holding the photoconductor drums 61, not-illustrated chargers, and the four cartridges 50 so as to be mountable and removable, an in-housing temperature sensor SE1, and a first contact CN 1. The four photoconductor drums 61 and the four chargers respectively corresponding to the four developing rollers 52 are provided at the frame 62.

The frame 62 is supported by the body housing 10 so as to be movable in the direction orthogonal to the vertical direction. The in-housing temperature sensor SE1 is, for example, a thermistor, configured to obtain an in-housing temperature which is a temperature in the body housing 10. The first contact CN1 is conductive with the in-housing temperature sensor SE1 through the wiring.

The body housing 10 includes a second contact CN2 conductive with the controller 100 through the wiring. The first contact CN1 is being coupled to the second contact CN2 in a state in which the drawer 60 is disposed at the image forming position of the body housing 10. Specifically, when the drawer 60 is disposed at the image forming position, the first contact CN1 is coupled to the second contact CN2.

The first contact CN1 is spaced apart from the second contact CN2 in a state in which the drawer 60 is drawn out from the body housing 10. Specifically, when the drawer 60 is removed from the image forming position, the first contact CN1 is spaced apart from the second contact CN2.

The transfer unit 70 includes a drive roller 71, a driven roller 72, a conveying belt 73, and transfer rollers 74. The conveying belt 73 is an endless belt. The drive roller 71 and the driven roller 72 are rollers for rotating the conveying belt 73. The conveying belt 73 is held by and nipped between each of the four transfer rollers 74 and a corresponding one of the photoconductor drums 61. Each of the four transfer rollers 74 is disposed so as to be opposed to the corresponding one of the photoconductor drums 61.

The fixing device 80 is a device configured to fix a toner image on the sheet P. The fixing device 80 includes a heater 110, a first fixing member 81 heated by the heater 110, and a second fixing member 82. The sheet P is nipped between the first fixing member 81 and the second fixing member 82. The details of the fixing device 80 will be described later.

When the drawer 60 is located at the image forming position of the body housing 10, the color printer 1 is capable of forming an image. The image forming position is a position at which the photoconductor drums 61 are in contact with the transfer unit 70, and is the position at which the scanner unit 40 is capable of exposing predetermined positions of the photoconductor drums 61. In the image forming portion 30, surfaces of respective photoconductor drums 61 are uniformly charged by the chargers first, then, exposed by the scanner unit 40. Accordingly, electrostatic latent images are formed on respective photoconductor drums 61 based on image data. After that, toner in the containers 51 is supplied to the electrostatic latent images on the photoconductor drums 61 by the developing rollers 52, thereby forming toner images on the photoconductor drums 61.

Next, when the sheet P supplied onto the conveying belt 73 passes between each of the photoconductor drums 61 and the corresponding one of the transfer rollers 74, each of the toner images formed on each of the photoconductor drums 61 is transferred onto the sheet P. After that, the toner image transferred onto the sheet P is heat-fixed by the fixing device 80.

The conveying portion 90 functions as a discharge mechanism configured to discharge the sheet P conveyed from the image forming portion 30 to an discharge tray 13 of the body housing 10 and functions as a re-convey mechanism configured to convey the sheet P to the image forming portion 30 again in a state in which the sheet P in which the image is formed on one side by the image forming portion 30 is turned over. Specifically, the conveying portion 90 mainly includes a conveyance path 91, a discharging roller 92, a re-conveyance path 93.

The conveyance path 91 is a path in which the sheet P is guided from the fixing device 80 to the discharge tray 13.

The discharging roller 92 is configured to be rotatable in both normal and reverse directions, and configured to discharge the sheet P conveyed from the image forming portion 30 toward the discharge tray 13 at the time of normal rotation, and configured to convey the sheet P so as to pull the sheet P into the body housing 10 at the time of reverse rotation.

The re-conveyance path 93 is configured to guide the sheet P in which the image is formed on one side by the image forming portion 30 to the image forming portion 30 again so as to pass under the supplier 20.

The color printer 1 further includes a cover open/close sensor SE2, a first sheet sensor SE3, a second sheet sensor SE4, a temperature sensor SE5, a motor M, a transmission mechanism TM, and a second transmission mechanism TM2.

The cover open/close sensor SE2 is a sensor configured to detect opening and closing of the cover 11. As a part of the cover 11 is in contact with the cover open/close sensor SE2 when the cover 11 is closed, the cover open/close sensor SE2 outputs an ON signal to the controller 100. As the cover 11 is spaced apart from the cover open/close sensor SE2 when the cover 11 is opened, the cover open/close sensor SE2 outputs an OFF signal to the controller 100.

The first sheet sensor SE3 and the second sheet sensor SE4 are sensors configured to detect an existence of the sheet. Each of the first sheet sensor SE3 and the second sheet sensor SE4 has, for example, a swing member swinging when contacting the sheet P and an optical sensor configured to detect the swing of the swing member. In the embodiment, each of the first sheet sensor SE3 and the second sheet sensor SE4 outputs an ON signal when the swing member is tilted by the sheet P and outputs an OFF signal when the swing member is not tilted.

The first sheet sensor SE3 is located upstream of the photoconductor drums 61 in the conveying direction of the sheet P. The second sheet sensor SE4 is located downstream of the first sheet sensor SE3, specifically, downstream of the first fixing member 81 in the conveying direction of the sheet P.

The temperature sensor SE5 is a sensor configured to detect the temperature of the first fixing member 81 in a non-contact manner. The temperature sensor SE5 is opposed to an outer circumferential surface of the first fixing member 81 in the non-contact manner. The temperature sensor SE5 includes a thermistor configured to detect infrared rays from the first fixing member 81. The temperature sensor SE5 is used as a sensor for controlling the temperature of the heater 110.

The motor M is a motor configured to rotate the first fixing member 81. The motor M includes a hall element M1 as a rotation detection member configured to detect rotation of the motor M. The hall element M1 is used as a sensor for controlling a rotation speed of the motor M.

The transmission mechanism TM is a mechanism configured to transmit a drive force from the motor M to the developer image forming portion such as the drive roller 71 and the photoconductor drums 61, and the transmission mechanism TM is capable of cutting off transmission of the drive force from the motor M to the developer image forming portion. Specifically, the transmission mechanism TM includes a clutch CL capable of cutting off transmission of the drive force.

The second transmission mechanism TM2 is a mechanism configured to transmit the drive force from the motor M to the first fixing member 81. The second transmission mechanism TM2 is a gear train without a one-way clutch. According to the mechanism, the motor M is rotated when the first fixing member 81 is rotated in any direction.

The controller 100 includes a CPU, a ROM, a RAM, and the like, and the controller 100 is configured to execute various processes in accordance with programs prepared in advance in response to reception of a print command and the like. The controller 100 is capable of obtaining signals from respective sensors SE1 to SE5.

Figure 2:
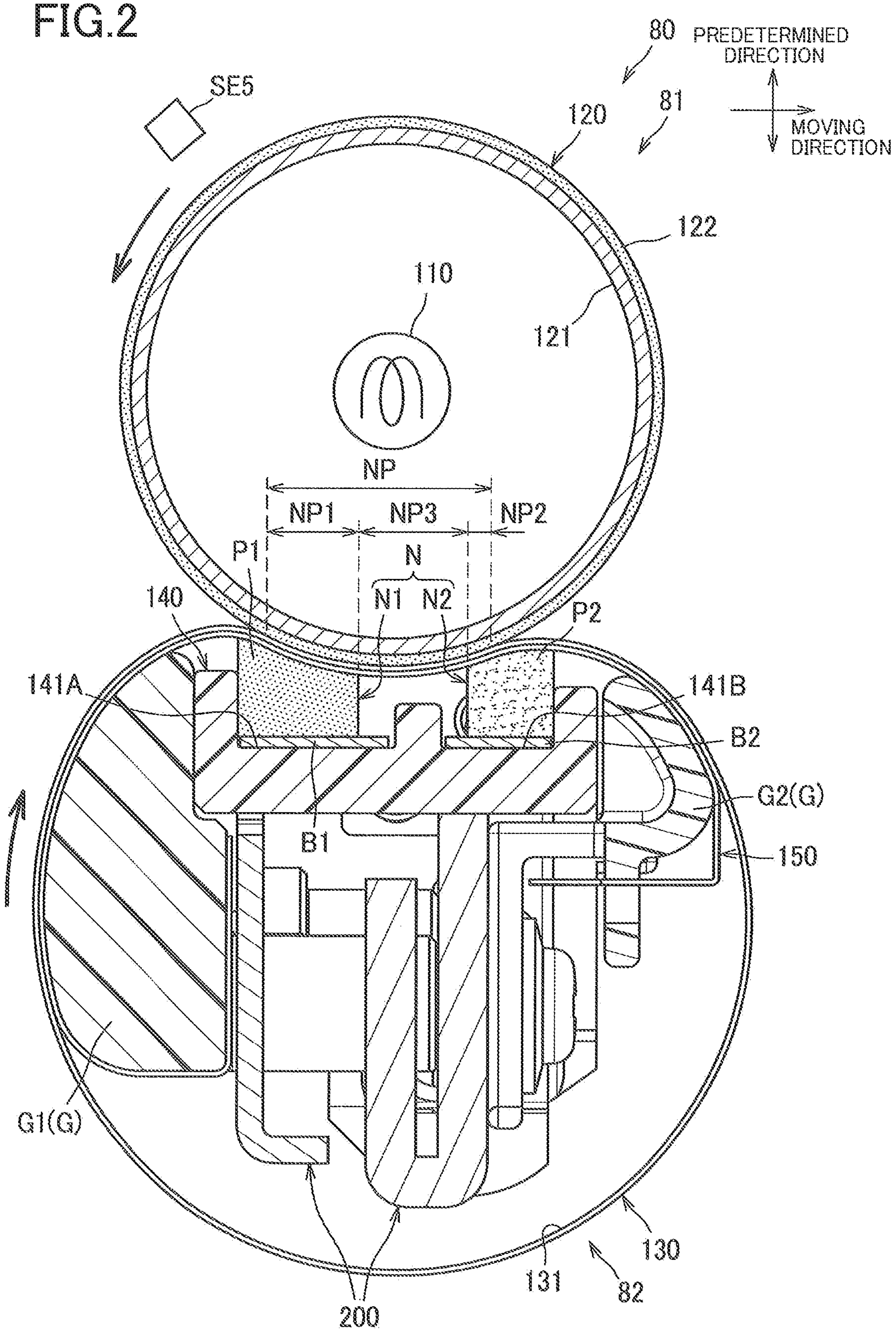
FIG. 2 is a cross-sectional view illustrating a fixing device.

As illustrated in FIG. 2, the fixing device 80 includes the heater 110, the first fixing member 81, the second fixing member 82, the temperature sensor SE5. The first fixing member 81 has a roller 120.

The heater 110 is a halogen lamp, and configured to emit light and generate heat by energization to heat the roller 120 by radiant heat. The heater 110 is disposed so as to extend inside the roller 120 along a rotation axis of the roller 120. Here, a direction along the rotation axis of the roller 120 is an axial direction of the first fixing member 81, and the direction along the rotation axis of the roller 120 will be also refereed to merely as an "axial direction" in the following description.

The roller 120 is a tubular roller and heated by the heater 110. The roller 120 includes a tube blank 121 made of metal or the like, and an elastic layer 122 covering an outer circumferential surface of the tube blank 121. The elastic layer 122 is made of rubber such as silicone rubber. In the embodiment, the roller 120 has a concave shape in which outer diameters at both ends in the axial direction are greater than an outer diameter at a center in the axial direction, and the outer diameter gradually increases from the center toward each of the ends in the axil direction. However, the shape of the roller 120 is not limited to this. The roller 120 may be, for example, a cylindrical roller in which the outer diameter is uniform in the axial direction. The roller 120 may also be a crown-shaped roller in which the outer diameter gradually decreases from the center toward each of the ends in the axial direction.

Both end portions of the roller 120 in the axial direction are rotatably supported by a later-described frame FL, specifically, side frames 83 (see FIG. 3), and the end portions of the roller 120 are driven to rotate in a counter-clockwise direction of FIG. 2 when the drive force is inputted from the motor M.

The second fixing member 82 is linearly movable in a predetermined direction coming close to/going away from the first fixing member 81. The predetermined direction is orthogonal to the axial direction. The second fixing member 82 is urged toward the first fixing member 81 by a later-described switching mechanism 300 (see FIG. 3).

The second fixing member 82 includes an endless belt 130, a nip forming member N, a holder 140, a stay 200, a belt guide G, and a sliding sheet 150.

The belt 130 is a long tubular member, having flexibility. The belt 130 has a base material made of such as metal or resin and a mold release layer covering an outer circumferential surface of the base material, though not illustrated. The belt 130 is driven to be rotated in a clockwise direction of FIG. 2 by friction with the roller 120 or the sheet P when the rotor 120 rotates. Lubricant such as grease is applied to an inner circumferential surface of the belt 130. The nip forming member N, the holder 140, the stay 200, the belt guide G, and the sliding sheet 150 are disposed inside the belt 130.

The nip forming member N forms the nip portion NP when the belt 130 is nipped between the nip forming member N and the roller 120. The nip forming member N includes a first nip forming member N1 and a second nip forming member N2.

The first nip forming member N1 includes a first pad P1 and a first fixing plate B1.

The first pad P1 is a rectangular parallelepiped member. The first pad P1 is made of rubber such as silicone rubber.

The first pad P1 forms an upstream nip portion NP1 when the belt 130 is nipped between the first pad P1 and the roller 120.

In the following description, a moving direction of the belt 130 in the upstream nip portion NP1 and the later-described nip portion NP is referred to merely as a "moving direction". The moving direction is along an outer circumferential surface of the roller 120 in the embodiment. This direction is along a direction almost orthogonal to the predetermined direction and the axial direction; therefore, the moving direction is illustrated as the direction orthogonal to the predetermined direction and the axial direction. The moving direction is the same direction as the conveying direction of the sheet P in the nip portion NP. It is noted that an upstream side and a downstream side in the moving direction are also referred to merely as "upstream, downstream" in the following description.

The first pad P1 is fixed to a surface of the first fixing plate B1 on the roller 120 side. The first pad P1 slightly protrudes to the upstream side in the moving direction from an upstream end of the first fixing plate B1. Accordingly, the first pad P1 contacts the holder 140 on the upstream side.

The first fixing plate B1 is made of a member, for example, metal, harder than the first pad P1.

The second nip forming member N2 is disposed with a space on the downstream side of the first nip forming member N1 in the moving direction. That is, the second nip forming member N2 is spaced apart from the first nip forming member N1 in the conveying direction of the sheet P. The second nip forming member N2 has a second pad P2 and a second fixing plate B2.

The second pad P2 is a rectangular parallelepiped member. The second pad P2 is made of rubber such as silicone rubber. The second pad P2 forms a downstream nip portion NP2 when the belt 130 is nipped between the second pad P2 and the roller 120. The second pad P2 is spaced apart from the first pad P1 in the moving direction.

Accordingly, there exists an intermediate nip portion NP3, positioned between the upstream nip portion NP1 and the downstream nip portion NP2, on which pressure from the second fixing member 82 does not directly act. In the intermediate nip portion NP3, while the belt 130 is in contact with the roller 120, the belt 130 is not nipped between any of the first pad P1 and the second pad P2, and the roller 120; therefore, pressure is hardly applied. Accordingly, the sheet P passes the intermediate nip portion NP3 almost without being pressurized while being heated by the roller 120. In the embodiment, an area from an upstream end of the upstream nip portion NP1 to a downstream end of the downstream nip portion NP2, namely, the whole area where the outer circumferential surface of the belt 130 contacts the roller 120 is referred to as the nip portion NP. That is, in the embodiment, the nip portion NP includes the portion where a pressing force from the first pad P1 and the second pad P2 is not applied.

Figure 6A:
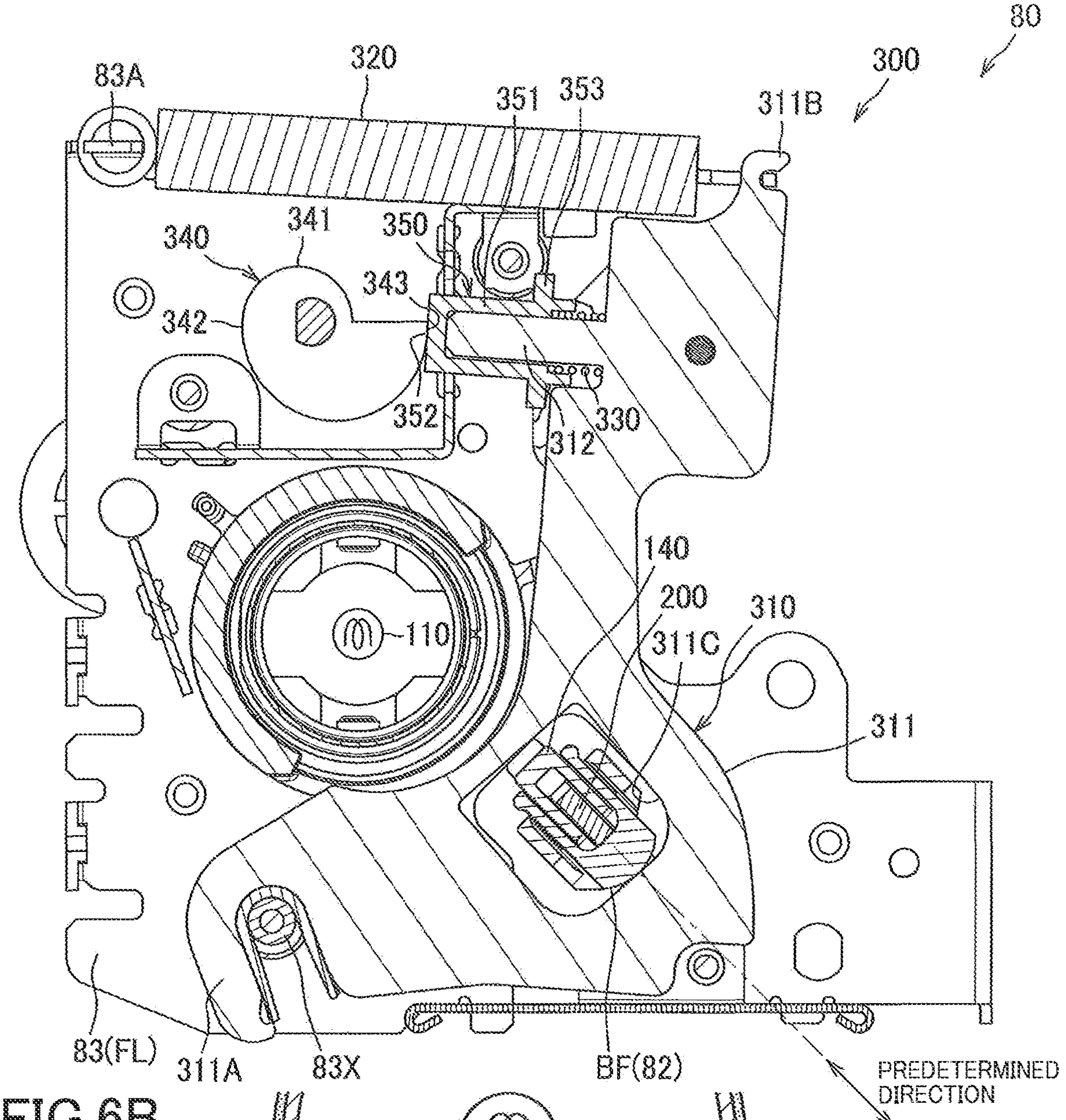
FIG. 6A is a cross-sectional view illustrating the switching mechanism obtained when the nip state is in a low nip state.
Figure 6B:
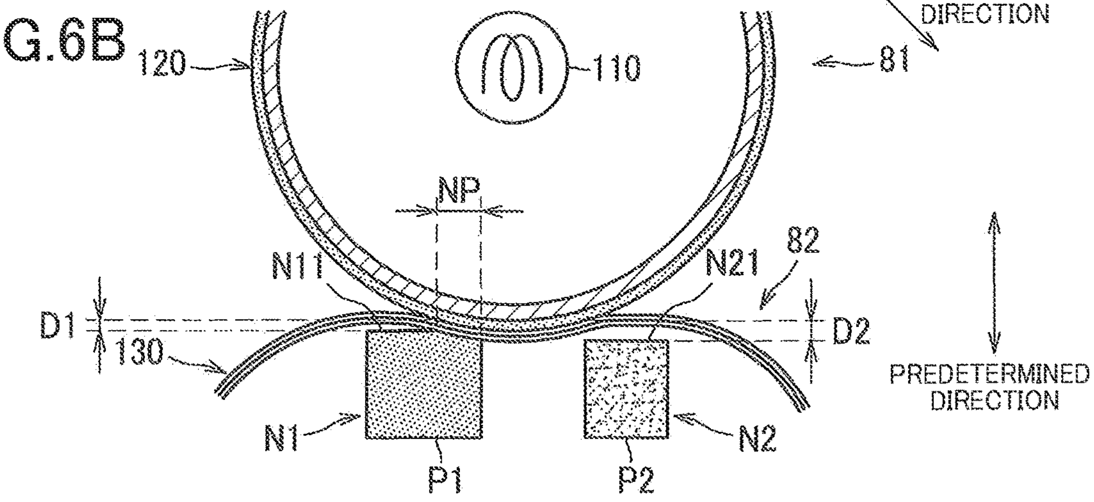
FIG. 6B is a cross-sectional view illustrating a structure around the nip portion.

The second pad P2 is fixed to a surface of the second fixing plate B2 on the roller 120 side. The first pad P2 slightly protrudes to the downstream side from a downstream end of the second fixing plate B2 in the moving direction. Accordingly, the second pad P2 contacts the holder 140 on the downstream side. As illustrated in FIG. 6B, a dimension of the second pad P2 is smaller than a dimension of the first pad P1 in the predetermined direction.

The second fixing plate B2 is made of a member, for example, metal, harder than the second pad P2. A dimension of the second fixing plate B2 is the same as that of the first fixing plate B1 in the predetermined direction.

It is noted that the hardness of the first pad P1 is higher than the hardness of the elastic layer 122 of the roller 120. The hardness of the second pad P2 is higher than the hardness of the first pad P1. That is, the first pad P1 is softer than the second pad P2.

Here, the hardness means the durometer hardness specified by ISO7619-1. The durometer hardness is a value obtained from a pushing depth of a predetermined push needle at the time of pushing the push needle into a test piece under predetermined conditions. For example, in a case where a durometer hardness of the elastic layer 122 is 5, a durometer hardness of the first pad P1 is preferably 6 to 10, and a durometer hardness of the second pad P2 is preferably 70 to 90.

The hardness of the silicone rubber can be adjusted by changing a ratio of additives (a silica-based filler or a carbon-based filler) which is added at the time of manufacture. Specifically, when the ratio of additives is increased, the hardness of rubber is increased. The hardness can be reduced by adding silicone-based oil. As manufacturing methods for rubber, liquid injection molding and extrusion molding can be adopted. Generally, the liquid injection molding is suitable for low-hardness rubber, and the extrusion molding is suitable for high-hardness rubber.

The holder 140 is a member holding the nip forming member N. That is, the first nip forming member N1 and the second nip forming member N2 are supported by a single holder 140. The holder 140 is supported by the stay 200.

The holder 140 includes a first support surface 141A supporting a surface of the first nip forming member N1 on the opposite side of the first fixing member 81, and a second support surface 141B supporting a surface of the second nip forming member N2 on the opposite side of the first fixing member 81. The first support surface 141A and the second support surface 141B are located at the same position in the predetermined direction. That is, the first support surface 141A and the second support surface 141B are aligned with each other in the moving direction.

Accordingly, the first nip forming member N1 protrudes to the first fixing member 81 side more than the second nip forming member N2 as illustrated in FIG. 6B. In other words, a first distal end surface N11 which is a surface of the first nip forming member N1 on the first fixing member 81 side is located closer to the first fixing member 81 than a second distal end surface N21 which is a surface of the second nip forming member N2 on the first fixing member 81 side. More specifically, the first distal end surface N11 is located closer to the first fixing member 81 than the second distal end surface N21 in a state in which the respective nip forming members N1, N2 are not pressed onto the first fixing member 81.

Here, FIG. 6B illustrates a state in which only a part of the first distal end surface N11 of the first nip forming member N1 is pressed onto the first fixing member 81, and the other part of the first distal end surface N11 and the second distal end surface N21 are not pressed onto the first fixing member 81. Therefore, each of positions of the other part of the first distal end surface N11 and the second distal end surface N21 is the same position as each of positions of the other part of the first distal end surface N11 and the second distal end surface N2 in the state in which each of the nip forming members N1, N2 is not pressed onto the first fixing member 81. That is, the other part of the first distal end surface N11 is located closer to the first fixing member 81 than the second distal end surface N21. In other words, a shortest distance D1 between a portion, of the first distal end surface N11, to which pressure is not applied and the outer circumferential surface of the first fixing member 81 in the predetermined direction is smaller than a shortest distance D2 between the second distal end surface N21 to which pressure is not applied and the outer circumferential surface of the first fixing member 81.

The stay 200 is a member positioned on the opposite side of the nip forming member N with respect to the holder 140 and supporting the holder 140. The stay 200 is made of metal or the like. A buffer member BF made of resin or the like (see FIG. 4A) is mounted to an end portion of the stay 200 in the axial direction. The buffer member BF is a member for suppressing the stay 200 made of metal from being rubbed against a later-described metal arm 310 (see FIG. 4A).

The belt guide G is a member guiding an inner circumferential surface 131 of the belt 130. The belt guide G is made of resin or the like having heat resistance. The belt guide G includes an upstream guide G1 and a downstream guide G2.

The sliding sheet 150 is a rectangular sheet for reducing frictional resistance between the respective pads P1, P2 and the belt 130. The sliding sheet 150 is nipped between the inner circumferential surface 131 of the belt 130 and the respective pads P1, P2 in the nip portion NP. The sliding sheet 150 is made of an elastically deformable material. Any type of material can be used for the sliding sheet 150, but a resin sheet containing polyimide is adopted in the embodiment.

Figure 3:
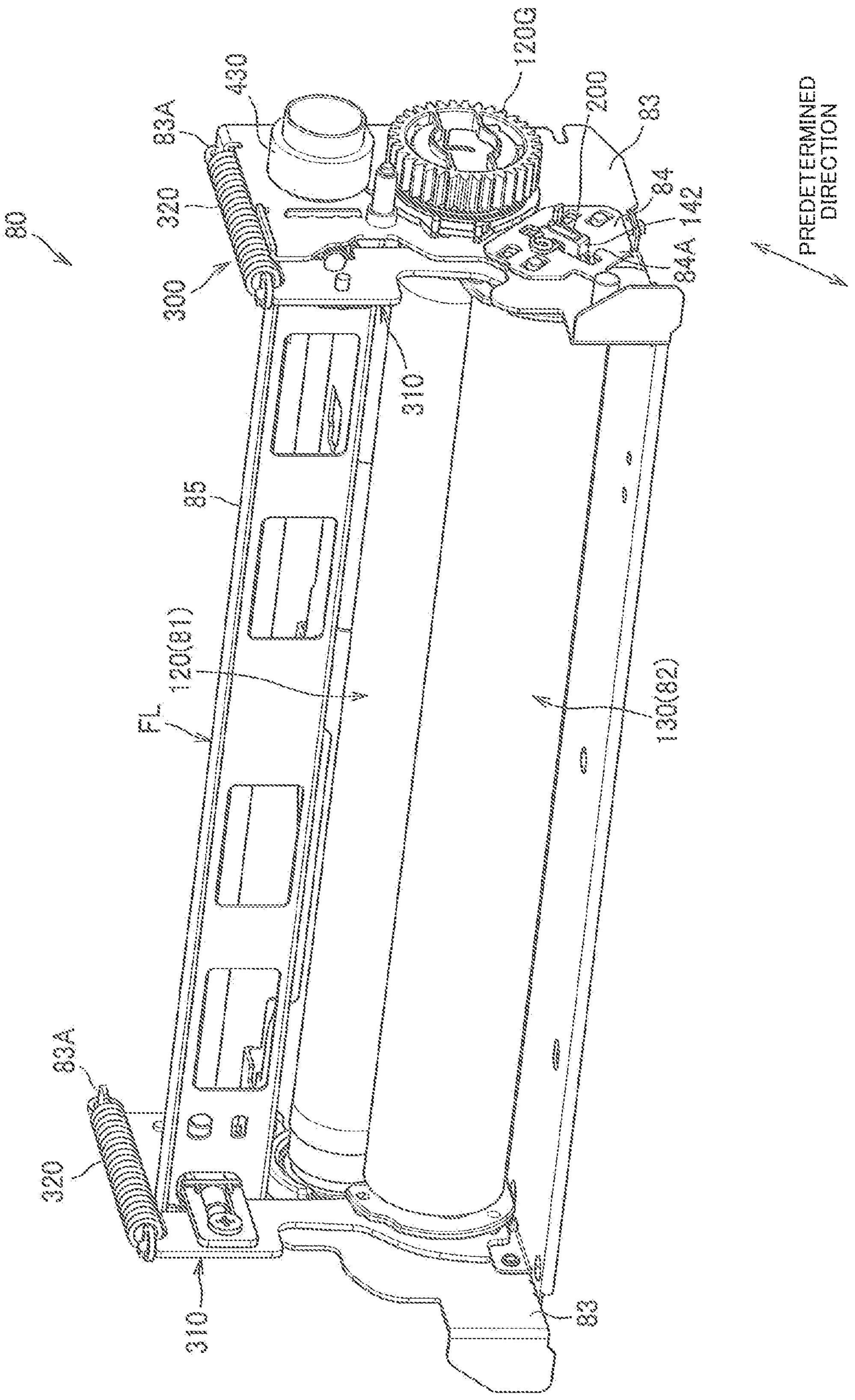
FIG. 3 is a perspective view illustrating a switching mechanism.

As illustrated in FIG. 3, the fixing device 80 further includes the frame FL and the switching mechanism 300. The frame FL is a frame supporting the first fixing member 81 and the second fixing member 82, and the frame FL is made of metal or the like. The frame FL includes side frames 83 and brackets 84 disposed on both sides of the first fixing member 81 and the second fixing member 82 in the axial direction and a connection frame 85 connected to each of the side frames 83.

The side frames 83 are frames supporting the first fixing member 81 and the second fixing member 82. Each of the side frames 83 includes a spring engaging portion 83A engaging with one end portion of a later-described first spring 320.

The brackets 84 are members supporting the second fixing member 82 so as to be movable in the predetermined direction, and the brackets 84 are respectively fixed to the side frames 83. More specifically, the brackets 84 disposed on both sides in the axial direction have first long holes 84A supporting end portions 142 of the holder 140 in the axial direction so as to be movable in the predetermined direction. The first long holes 84A are long holes extending in the predetermined direction.

Here, the first long holes 84A correspond to grooves as guides. The end portions 142 of the holder 140 in the axial direction are respectively inserted into the first long holes 84A on both sides in the axial direction and the second fixing member 82 is supported so as to be movable in the predetermined direction. The grooves as guides may be bottomed grooves.

The switching mechanism 300 is driven by the controller 100, and is a mechanism capable of switching a nip state of the first fixing member 81 and the second fixing member 82 to a strong nip state, a middle nip state in which a nip pressure is lower than that of the strong nip state, and a low nip state in which the nip pressure is lower than that of the middle nip state. Here, the belt 130 is nipped between at least one of the pads P1 and P2, and the first fixing member 81 in any state of the strong nip state, the middle nip state, and the low nip state.

Figure 4A:
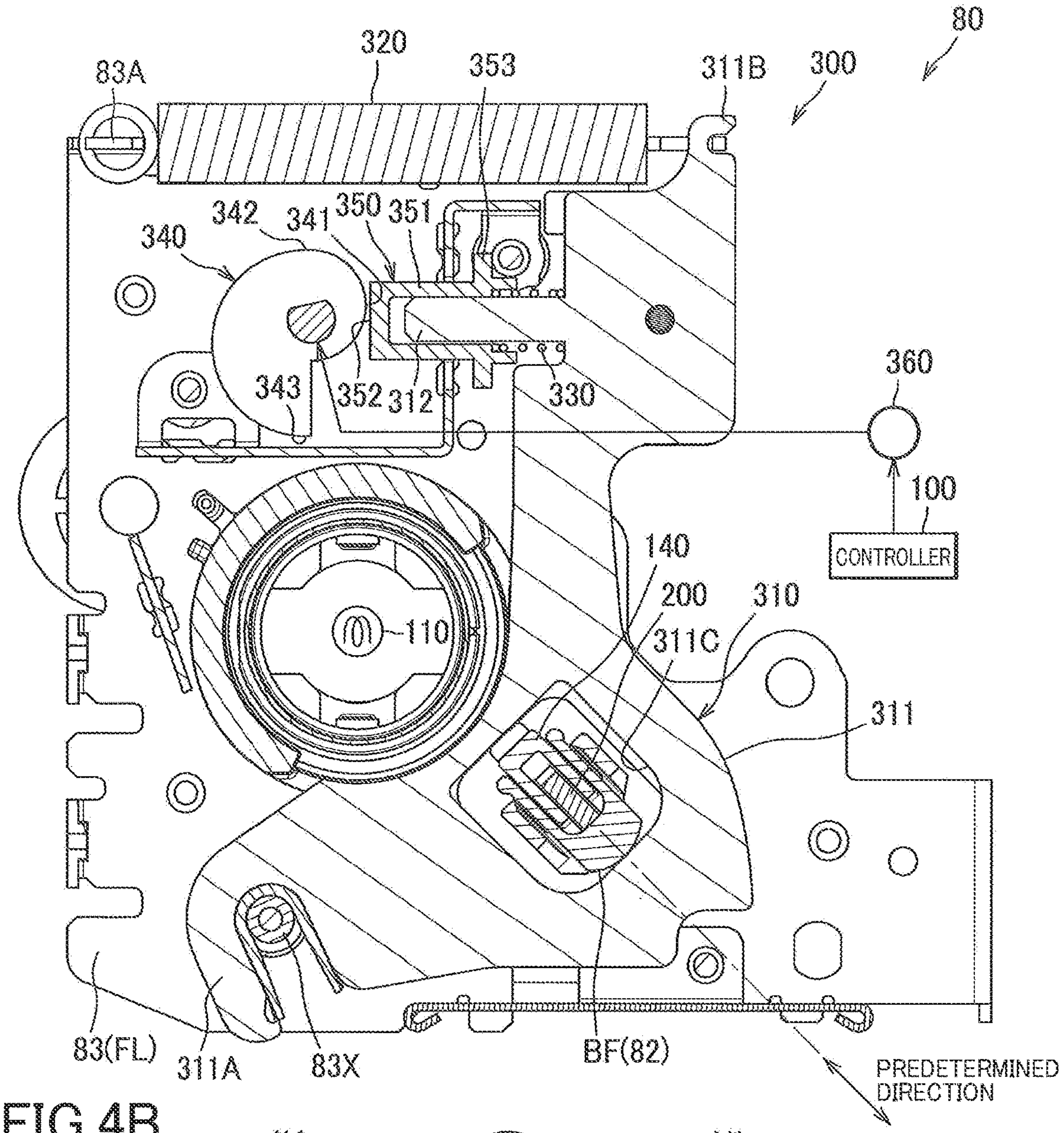
FIG. 4A is a cross-sectional view illustrating the switching mechanism obtained when a nip state is in a strong nip state.

As illustrated in FIG. 4A, the switching mechanism 300 includes the arms 310, first springs 320 as examples of springs, second springs 330, cams 340, and a second motor 360 configured to drive the cams 340. The arms 310, the first springs 320, the second springs 330 and the cams 340 are provided on one end side and the other end side of the frame FL in the axial direction, respectively.

Each of the arms 310 is a member for pressing the stay 200 toward the first fixing member 81 through the buffer member BF. Each of the arms 310 supports the second fixing member 82 and is supported by the side frame 83 so as to be pivotable.

Each of the arms 310 has an arm body 311 and a cam follower 350. The arm body 311 is a plate-like member with an L-shape made of metal or the like.

Each of the side frames 83 includes a boss 83X supporting the arm body 311 so as to be pivotable. The arm body 311 includes one end portion 311A supported by the boss 83X of the side frame 83 so as to be pivotable, the other end portion 311B to which the first spring 320 is coupled, and an engaging hole 311C supporting the second fixing member 82. The engaging hole 311C is disposed between the one end portion 311A and the other end portion 311B and engaged with the buffer member BF.

The arm body 311 further includes a guide protrusion 312 extending toward the cam 340. The guide protrusion 312 is disposed between the other end portion 311B and the engaging hole 311C in a direction directed from the other end portion 311B toward the engaging hole 311C.

The cam follower 350 is mounted to the guide protrusion 312 so as to be movable with respect to the guide protrusion 312 of the arm body 311, and the cam follower 350 can contact the cam 340. The cam follower 350 is made of resin or the like, and includes a tubular portion 351 fitted into the guide protrusion 312, a contact portion 352 provided at one end of the tubular portion 351, and a flange portion 353 provided at the other end of the tubular portion 351.

The tubular portion 351 is supported by the guide protrusion 312 so as to be movable in a direction in which the guide protrusion 312 extends. The contact portion 352 is a wall blocking an opening of the end portion of the tubular portion 351 on the cam 340 side, and the contact portion 352 is disposed between the cam 340 and a tip end of the guide protrusion 312. The flange portion 353 protrudes from the other end of the tubular portion 351 in a direction orthogonal to the moving direction of the cam follower 350.

Then, the second spring 330 is disposed between the tubular portion 351 and the arm body 311. Accordingly, the arm body 311 is urged by the first spring 320 and can be urged by the second spring 330.

The first spring 320 is a spring configured to apply a load to the nip portion NP by applying a first urging force to the second fixing member 82. Specifically, the first spring 320 applies the first urging force to the second fixing member 82 through the arm body 311.

More specifically, the first spring 320 urges the first pad P1 and the second pad P2 toward the roller 120 through the arm body 311, the buffer member BF, the stay 200, and the holder 140. The first spring 320 is an extension coil spring made of metal or the like, one end of which is coupled to the spring engaging portion 83A of the side frame 83 and the other end is coupled to the other end portion 311B of the arm body 311.

The second spring 330 is a spring capable of applying a second urging force in a direction opposite to the first urging force to the second fixing member 82. Specifically, the second spring 330 can apply the second urging force to the second fixing member 82 through the arm body 311. The second spring 330 is a compression coil spring made of the metal or the like, and is disposed between the tubular portion 351 and the arm body 311 in a state in which the guide protrusion 312 is inserted into a space surrounded by the compression coil spring.

The cam 340 is a member configured to move the second fixing member 82 in the predetermined direction by pressing the arm 310 through the cam follower 350. The cam 340 has a function of changing an extension/contraction state of the second spring 330 to a first extension/contraction state in which the second urging force is not applied to the second fixing member 82, a second extension/contraction state in which the second urging force is applied to the second fixing member 82, and a third extension/contraction state in which the spring is more deformed than the second extension/contraction state. The cam 340 is supported by the side frame 83 so as to be pivotable to be positioned at a first cam position illustrated in FIG. 4A, a second cam position illustrated in FIG. 5A, and a third cam position illustrated in FIG. 6A. Specifically, the cam 340 is configured such that the cam 340 pivots to each of the cam positions when a drive force of the second motor 360 is intermittently supplied to the cam 340 by the controller 100. The intermittent supply of the drive force from the second motor 360 to the cam 340 may be executed by controlling a drive-force transmission switching mechanism such as a clutch that switches transmission of the drive force transmitted from the second motor 360 to the cam 340 by the controller, or may be executed by switching drive/stop of the second motor 360 by the controller 100.

The cam 340 is made of resin or the like, and includes a first portion 341, a second portion 342, and a third portion 343. The first portion 341, the second portion 342, and the third portion 343 are located on an outer circumferential surface of the cam 340.

The first portion 341 is a portion closest to the cam follower 350 when the cam 340 is located at the first cam position. As illustrated in FIG. 4A, the first portion 341 is spaced apart from the cam follower 350 when the cam 340 is located at the first cam position.

Figure 5A:
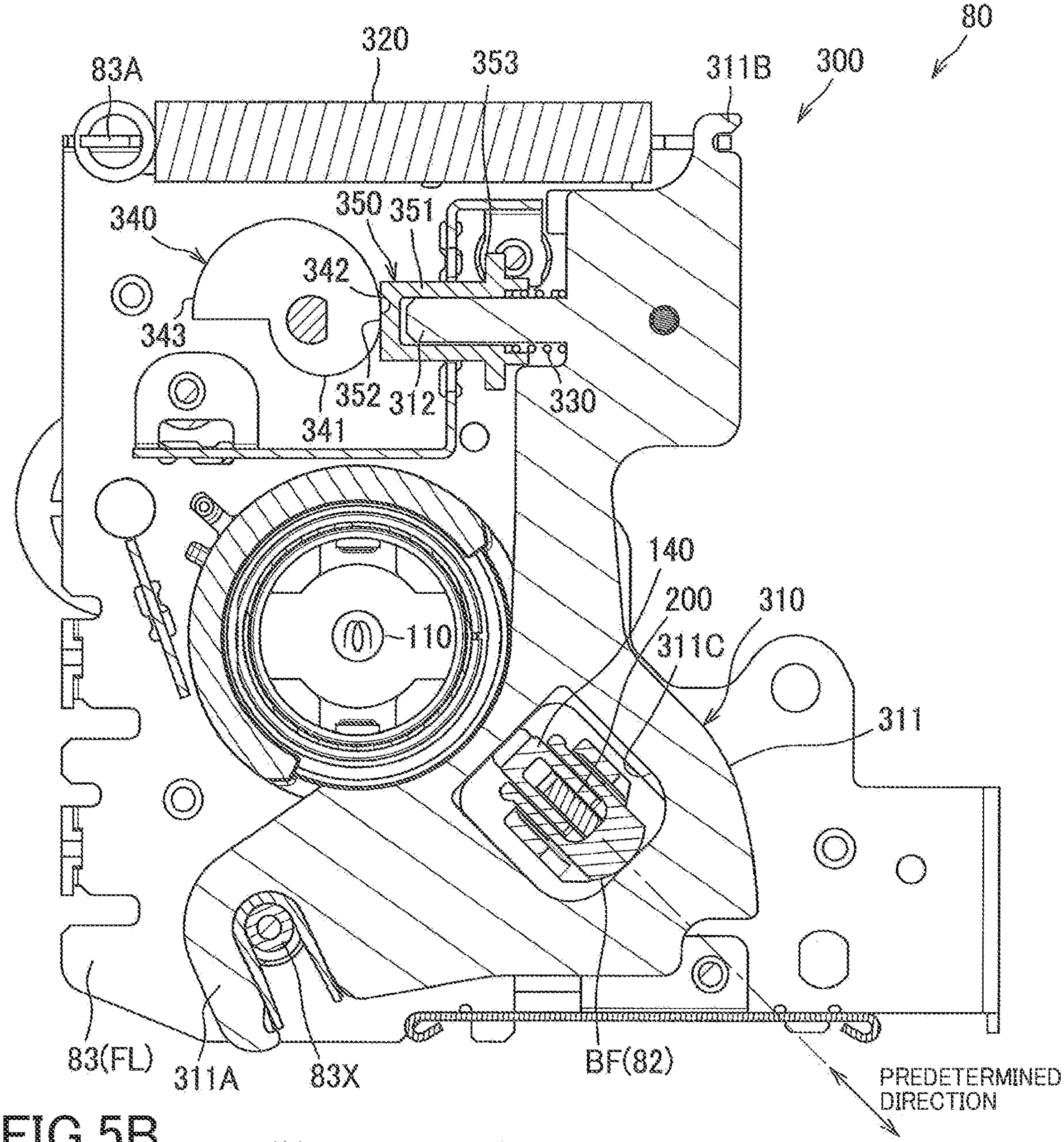
FIG. 5A is a cross-sectional view illustrating the switching mechanism obtained when the nip state is in a middle nip state.

The second portion 342 is a portion which comes into contact with the cam follower 350 when the cam 340 is located at the second cam position. More specifically, the second portion 342 is a portion which comes into contact with the cam follower 350 when the cam 340 pivots approximately 90 degrees in the illustrated clockwise direction from the first cam position as illustrated in FIG. 5A. A distance from the second portion 342 to a pivot center of the cam 340 is greater than a distance from the first portion 341 to the pivot center of the cam 340.

The third portion 343 is a portion which comes into contact with the cam follower 350 when the cam 340 is located at the third cam position. More specifically, the third portion 343 is a portion in a state in which the cam 340 pivots approximately 270 degrees in the illustrated clockwise direction from the first cam position, in other words, a portion which comes into contact with the cam follower 350 when the cam 340 pivots approximately 180 degrees in the illustrated clockwise direction from the second composition as illustrated in FIG. 6A. A distance from the third portion 343 to the pivot center of the cam 340 is greater than the distance from the second portion 342 to the pivot center of the cam 340.

When the cam 340 is located at the first cam position, the cam 340 is spaced apart from the cam follower 350; therefore, the extension/contraction state of the second spring 330 is in the first extension/contraction state. When the cam 340 causes the extension/contraction state of the second spring 330 to be in the first extension/contraction state as described above, the arm body 311 is in a first posture illustrated in FIG. 4A.

Specifically, the cam 340 is spaced apart from the cam follower 350 when the cam 340 causes the extension/contraction state of the second spring 330 to be in the first extension/contraction state; therefore, the second urging force of the second spring 330 is not applied to the second fixing member 82 through the arm body 311, and only the first urging force of the first spring 320 is applied to the respective pads P1, P2 of the second fixing member 82 through the arm body 311. When the first urging force is applied to the second fixing member 82 by the first spring 320 and the second urging force is not applied to the second fixing member 82 by the second spring 330 as described above, the nip state is in the strong nip state, and the nip pressure is a first nip pressure. Then, in the strong nip state, the belt 130 is nipped between the respective pads P1, P2 and the first fixing member 81.

When the cam 340 pivots from the first cam position illustrated in FIG. 4A to the second cam position illustrated in FIG. 5A, the cam 340 comes into contact with the cam follower 350 and moves the cam follower 350 by a predetermined amount with respect to the arm body 311. Accordingly, the extension/contraction state of the second spring 330 is in the second extension/contraction state in which the spring is more deformed than the first extension/contraction state when the cam 340 is located at the second cam position.

The cam follower 350 is supported by the cam 340 when the cam 340 is located at the second cam position; therefore, the second urging force of the second spring 330 is applied to the second fixing member 82 in the direction opposite to the first urging force through the arm body 311. Accordingly, when the first urging force is applied to the second fixing member 82 by the first spring 320 and the second urging force is applied to the second fixing member 82 in the direction opposite to the first urging force by the second spring 330, the nip state is in the middle nip state, and the nip pressure is a second nip pressure smaller than the first nip pressure. In the middle nip state, the belt 130 is nipped between the respective pads P1, P2 and the first fixing member 81.

When the cam 340 causes the extension/contraction state of the second spring 330 to be in the second extension/contraction state, the arm body 311 remains in the above-described first posture. Here, in the state in which the second pad P2 is pressed onto the roller 120, namely, in the state in which the load is applied to the second pad P2, the second pad P2 is hardly deformed regardless of magnitude of the load. Then, the second pad P2 is hardly deformed; therefore, the posture of the stay 200 supporting the second pad P2 and the posture of the arm 310 supporting the stay 200 are maintained almost in fixed postures regardless of magnitude of the load. Since the position of the first pad P1 is determined by the position of the second pad P2, the position of the first pad P1 is not changed in a state in which the second pad P2 is hardly deformed and the position thereof is not changed. Therefore, an entire nip width (a length from an entrance of the upstream nip portion NP1 to an exit of the downstream nip portion NP2) is not changed and the posture of the arm 310 is maintained almost in the fixed posture in both cases of the strong nip state (the first nip pressure) and the middle nip state (the second nip pressure). Each of the strong nip state and the middle nip state corresponds to an entire nip state (an example of a first nip state) in which the belt 130 is nipped between the respective pads P1, P2 and the first fixing member 81.

The reason why the second pad P2 is not deformed is that the hardness of second pad P2 is sufficiently higher than the hardness of the first pad P1 and the hardness of the elastic layer 122 of the roller 120. More specifically, the second pad P2 has the hardness in a degree in which the second pad P2 is hardly deformed with a nip pressure, which is required in the downstream nip portion NP2, falling within a range from the maximum nip pressure (the downstream nip pressure in the strong nip state) to the minimum nip pressure (the downstream nip pressure in the low nip state).

In other words, the maximum nip pressure and the minimum nip pressure required in the downstream nip are set to degrees of magnitudes of the nip pressure in which the second pad P2 is hardly deformed.

Here, "the second pad P2 is hardly deformed" includes that the second pad P2 is deformed to a degree (a deformation amount in the downstream nip width is not zero) that the deformation amount of a nip width of the downstream nip portion NP2 formed by the second pad P2 (a length and a position of the nip in the belt moving direction) does not affect image quality or conveyance of paper.

Figure 4B:
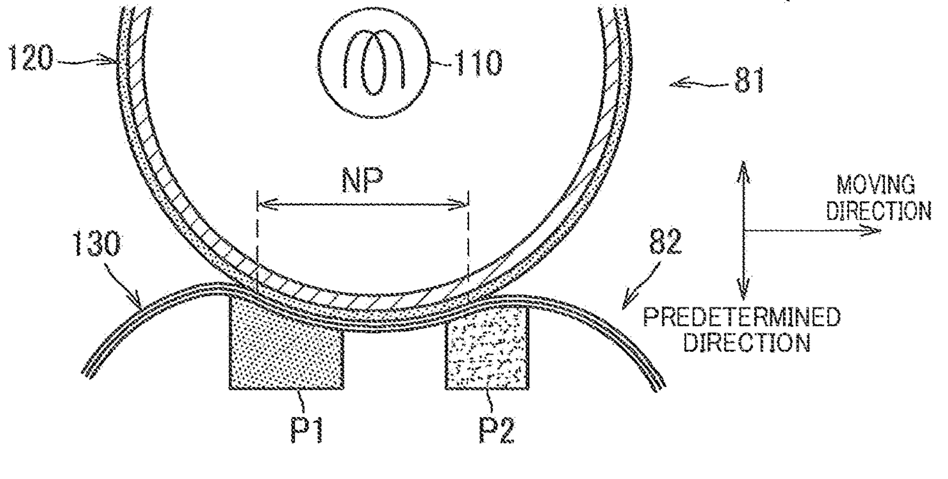
FIG. 4B is a cross-sectional view illustrating a structure around a nip portion.
Figure 5B:
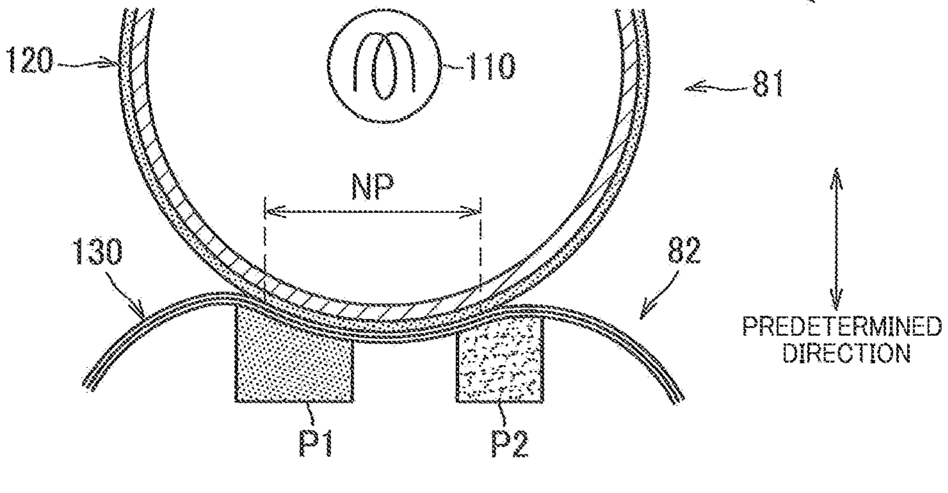
FIG. 5B is a cross-sectional view illustrating a structure around the nip portion.

Since the posture of the arm body 311 is in the first posture even when the extension/contraction state of the second spring 330 is any one of the first extension/contraction state and the second extension/contraction state as described above, the belt 130 is nipped between each of the first pad P1 and the second pad P2, and the roller 120 in both a state in which the nip pressure is the first nip pressure and a state in which the second nip pressure as illustrated in FIG. 4B and FIG. 5B. Specifically, since positions of the second fixing member 82 with respect to the roller 120 are approximately the same in both the state in which the nip pressure is the first nip pressure and the state in which the second nip pressure, widths (lengths in the moving direction) of the nip portion NP in both the state in which the nip pressure is the first nip pressure and the state in which the second nip pressure are approximately the same.

When the cam 340 pivots from the second cam position illustrated in FIG. 5A to the third cam position illustrated in FIG. 6A, the cam 340 further moves the cam follower 350 with respect to the arm body 311, then, the cam 340 presses the arm body 311 through the cam follower 350. Accordingly, the extension/contraction state of the second spring 330 becomes in the third extraction/contraction state in which the spring is more deformed than the second extension/contraction state, and the arm body 311 pivots from the first posture to a second posture different from the first posture.

Specifically, in an early stage in a pivoting process in which the cam 340 pivots from the second cam position to the third cam position, the cam follower 350 moves with respect to the arm body 311 so that the contact portion 352 of the cam follower 350 comes close to the tip end of the guide protrusion 312. When the contact portion 352 comes into contact with the tip end of the guide protrusion 312, the extension/contraction state of the second spring 330 becomes in the third extraction/contraction state. In the case in which the cam 340 causes the extension/contraction state of the second spring 330 to be in the third extraction/contraction state, the contact portion 352 as a part of the cam follower 350 is nipped between the cam 340 and the guide protrusion 312. In other words, the contact portion 352 comes into contact with the cam 340 as well as comes into contact with the guide protrusion 312. After that, when the cam 340 further pivots, the cam 340 presses the guide protrusion 312 through the contact portion 352; therefore, the arm body 311 pivots from the first posture to the second posture against the urging force of the first spring 320.

Accordingly, when the arm body 311 is in the second posture, the second fixing member 82 is disposed at a position more spaced apart from the roller 120 (the position of FIG. 6B) than a position in which the arm body 311 is in the first posture (the position of FIG. 5B). Since the position of the second fixing member 82 with respect to the roller 120 is changed as described above, the width of the nip portion NP becomes smaller when the arm body 311 is in the second posture than in the case in which the arm body 311 is in the first posture as illustrated in FIG. 6B, and the nip pressure becomes a third nip pressure smaller than the second nip pressure. That is, since the posture of the arm 310 is changed by the cam 340, the nip pressure and the nip width are changed. Specifically, when the arm 310 is in the second posture, the nip state is in the low nip state in which the belt 130 is nipped only between the first pad P1 and the roller 120 and the belt 130 is not nipped between the second pad P2 and the roller 120. Accordingly, when the arm 310 is in the second posture, an upstream nip pressure and an upstream nip width become small and the downstream nip pressure becomes zero. Moreover, since the urging force of the first spring 320 can be received by the cam 340 through the arm body 311 and the contact portion 352 of the cam follower 350 in the low nip state, the urging force of the first spring 320 is not applied to the first pad P1. That is, the nip portion NP is formed only by deformation of the first pad P1 in the low nip state. That is, the low nip state is a partial nip state (an example of a second nip state) in which the belt 130 is nipped between the pad P1 and the first fixing member 81 and the belt 130 is not nipped between the pad P2 and the first fixing member 81.

Figure 7A:
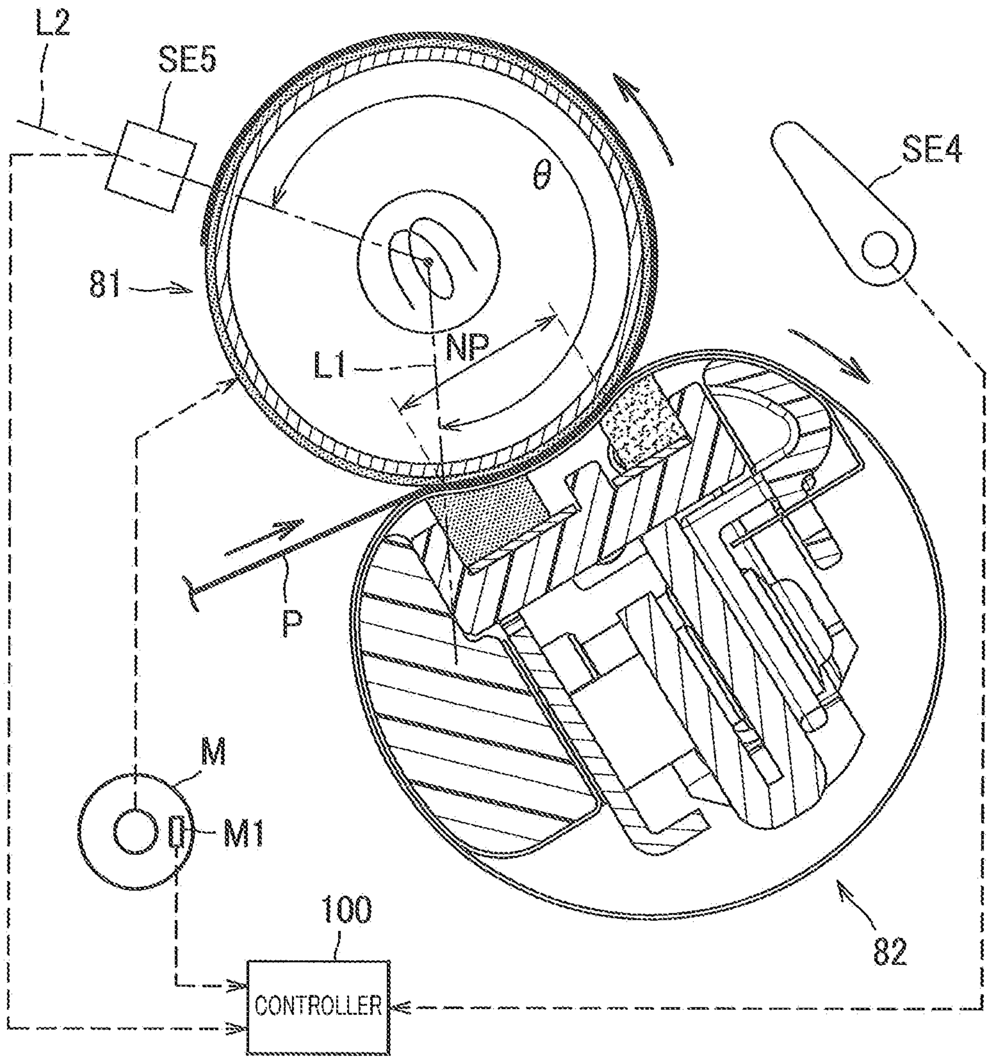
FIG. 7A is a view illustrating a state in which a sheet has wound around a first fixing member.

As illustrated in FIG. 7A, the temperature sensor SE5 is disposed at a position shifted by a predetermined angle θ from a position corresponding to the upstream end of the nip portion NP to the downstream side in a rotation direction of the first fixing member 81 at the time of printing. In other words, an angle made by a line L1 connecting the upstream end of the nip portion NP and the rotation center of the first fixing member 81 and a line L2 connecting the temperature sensor SE5 to the rotation center of the first fixing member 81, which is the angle within a range from the line L1 to the downstream side of the rotation direction of the first fixing member 81 and from the line L2 to the upstream side of the rotation direction of the first fixing member 81 is the predetermined angle θ.

Figure 7B:
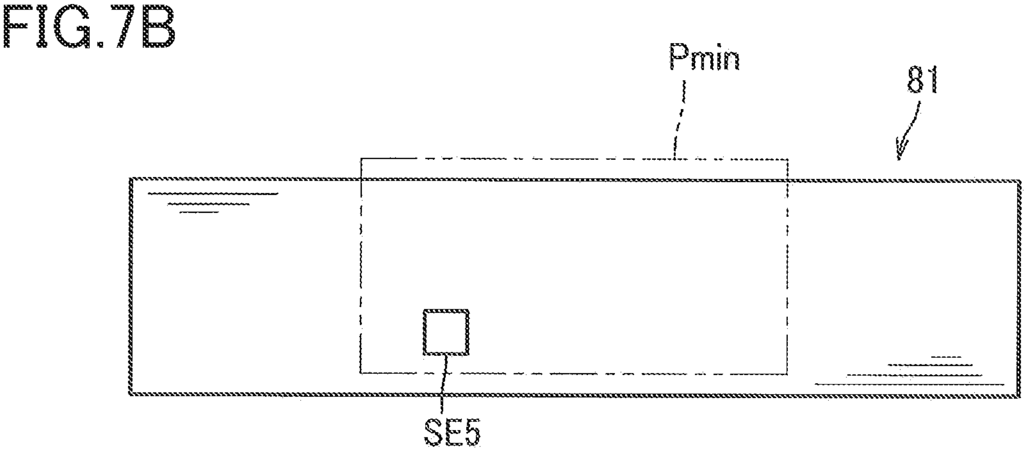
FIG. 7B is a view illustrating a relation between a sheet with the minimum width and a temperature sensor.

As illustrated in FIG. 7B, the temperature sensor SE5 is located within a width of a minimum sheet Pmin with a minimum width capable of being fixed by the fixing device 80. Accordingly, whichever size of the sheet P winds around the first fixing member 81, the sheet P enters between the temperature sensor SE5 and the first fixing member 81 as illustrated in FIG. 7A.

The controller 100 has a function of determining whether a jam error in which the sheet P stops in the middle of printing occurs or not. Specifically, the controller 100 can distinguish among a first jam error in which the sheet P is jammed at a position near the first sheet sensor SE3, a second jam error in which the sheet P is jammed at a position between the first sheet sensor SE3 and the second sheet sensor SE4, a third jam error in which the sheet P is jammed at a position near the second sheet sensor SE4, and a winding jam error in which the sheet P is jammed by winding around the first fixing member 81. The controller 100 determines that a jam error occurs when the sheet P is jammed at a printing path between the first sheet sensor SE3 and the second sheet sensor SE4 in a period extending from a start of printing to an end of printing.

The controller 100 determines that the error is the first jam error when a period of time during which the ON signal is outputted from the first sheet sensor SE3 exceeds a sheet length time, namely, when the sheet P is jammed at the position near the first sheet sensor SE3 and the first sheet sensor SE3 remains being tilted. Here, the sheet length time is a period of time corresponding to the length of the sheet P. When the sheet P passes the first sheet sensor SE3 normally, the first sheet sensor SE3 is turned on for a period of time obtained by dividing the length of the sheet P by a conveying speed of the sheet P; therefore, the sheet length time is set to become longer than the obtained period of time.

The controller 100 determines that the second jam error occurs when a particular sheet P is not detected by the second sheet sensor SE4 within a predetermined period of time from a time when the particular sheet P is detected by the first sheet sensor SE3, namely, in a case where the sheet P passes the first sheet sensor SE3 normally but the sheet P is jammed before reaching the second sheet sensor SE4. The controller 100 determines that the error is the third jam error when a period of time during which the ON signal is outputted from the second sheet sensor SE4 exceeds the sheet length time, namely, when the sheet P is jammed at the position near the second sheet sensor SE4 and the second sheet sensor SE4 remains being tilted.

Figure 8:
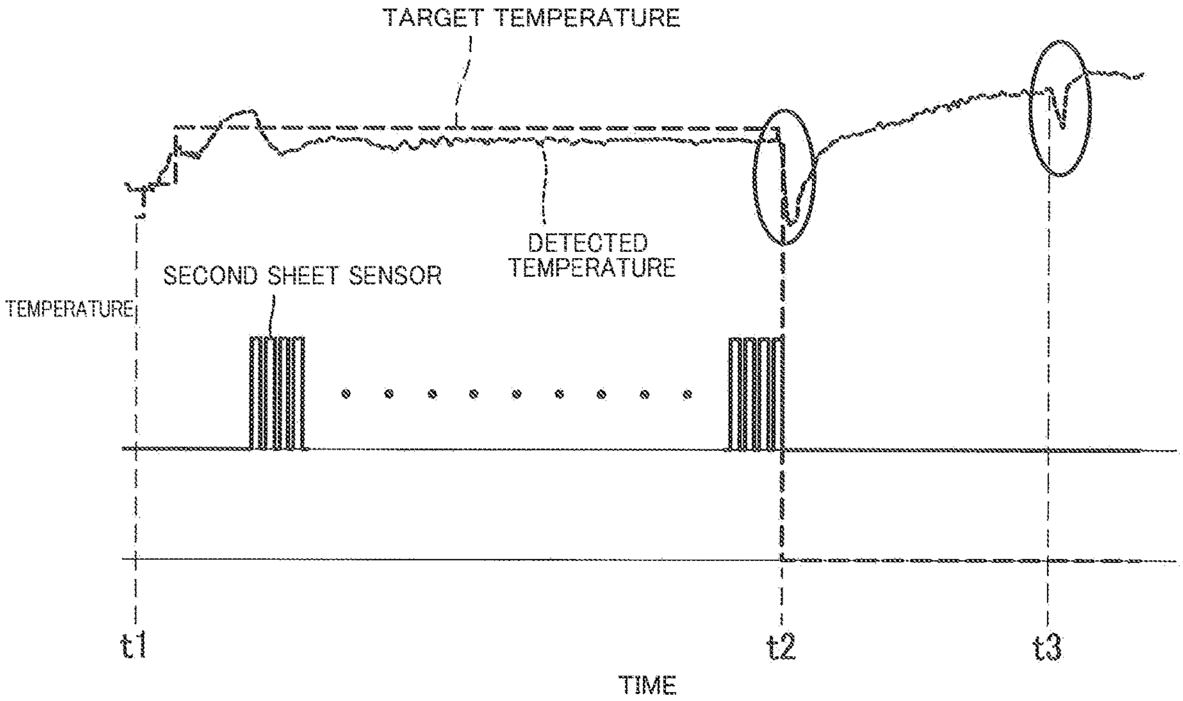
FIG. 8 is a graph illustrating variations in detected temperature detected by the temperature sensor from a time when the sheet winds around the first fixing member to a time when a user takes out the sheet.

The controller 100 determines that the sheet P has wound around the first fixing member 81 based on a decrease in detected temperature detected by the temperature sensor SE5. Here, the detected temperature is maintained in the vicinity of a target temperature of the first fixing member 81 in printing (a time t1 to a time t2) as illustrated in FIG. 8. However, when the sheet P having wound around the first fixing member 81 enters between the temperature sensor SE5 and the first fixing member 81 as illustrated in FIG. 7A, the detected temperature suddenly decreases as illustrated at the time t2 of FIG. 8. The controller 100 determines that the sheet P has wound around the first fixing member 81 and that the winding jam error occurs when a decrease amount of the detected temperature per a unit time is greater than a first predetermined amount.

The controller 100 further has a function of determining whether the sheet P having wound around the first fixing member 81 is removed or not based on a variation of the detected temperature after determining that the sheet P has wound around the first fixing member 81. Here, the detected temperature that suddenly decreases at the time t2 gradually increases after that as the sheet P having wound around the first fixing member 81 is heated by heat of the first fixing member 81. Then, when a distal end of the sheet P comes off from between the temperature sensor SE5 and the first fixing member 81 as the sheet P is pulled by the user in a direction opposite to the conveying direction, heated air between the temperature sensor SE5 and the first fixing member 81 is escaped from between the temperature sensor SE5 and the first fixing member 81, as a result, the detected temperature suddenly decreases as illustrated at a time t3 of FIG. 8. The controller 100 determines that the sheet P having wound around the first fixing member 81 is removed when determining that a decrease amount of the detected temperature per the unit time is greater than a second predetermined amount after determining that the sheet P has wound around the first fixing member 81, resetting the winding jam error based on the determination as a condition.

Here, rectangular waveforms illustrated in FIG. 8 are waveforms indicating that the sheet P has passed the second sheet sensor SE4. FIG. 8 illustrates an example of determining that the winding occurs when the second sheet sensor SE4 is ON at the time t2. This example is an example in which two sheets P enter the fixing device 80 in a state in which the two sheets P overlaps each other, and one sheet P of the two sheets has wound around the first fixing member 81 and the other sheet P passes the second sheet sensor SE4 normally.

Even in the case where it is difficult to determine an occurrence of the jam error based on the signal of the second sheet sensor SE4, the winding jam error caused by the winding can be determined with high accuracy by determining an occurrence of the winding around the first fixing member 81. In a case where one sheet P enters the fixing device 80 and has wound around the first fixing member 81, the second sheet sensor SE4 is not turned on within a predetermined period of time from the time of the turning-on of the first sheet sensor SE3. In this case, the controller 100 determines that the second jam error occurs and determines that the winding jam error occurs by determining the occurrence of the winding.

As illustrated in FIG. 7A, the controller 100 has a function of determining whether the motor M is rotated or not in a state in which electric current is not supplied to the motor M based on the signal from the hall element M1 and further determining that the sheet P having wound around the first fixing member 81 is removed on condition that it is determined that the motor M is rotated. Specifically, when the sheet P is pulled in the direction opposite to the conveying direction by the user, the first fixing member 81 being in contact with the sheet P is rotated in the illustrated clockwise direction; therefore, the motor M coupled to the first fixing member 81 is also rotated. Since the hall element M1 detects the rotation and outputs a signal when the motor M is rotated, the controller 100 determined based on the signal that the motor M is rotated.

The controller 100 does not reset the winding jam error when it is determined that the motor M is not rotated, and resets the winding jam error when it is determined that the motor M is rotated. Specifically, the controller 100 resets the winding jam error in a case where the motor M is rotated by a rotation phase angle θ2 or more of the motor M corresponding to a rotation phase angle θ1 of the first fixing member 81 obtained when a portion of the first fixing member 81 being opposed to the temperature sensor SE5 is rotated to the nip portion NP. Here, the rotation phase angle θ1 of the first fixing member 81 obtained when the portion of the first fixing member 81 being opposed to the temperature sensor SE5 is rotated to the nip portion NP corresponds to the above-described predetermined angle θ. The rotation phase angle θ2 of the motor M corresponding to the rotation phase angle θ1 of the first fixing member 81 is determined by a gear ratio between a gear provided at an end portion of the first fixing member 81 in the axial direction and a gear provided at an output shaft of the motor M.

It is noted that conditions for resetting the winding jam error include a condition of open/close of the cover 11 and a condition of insertion/drawing of the drawer 60 in the embodiment in addition to the above two conditions. Specifically, the controller 100 resets the winding jam error when it is determined that the motor M is rotated by the rotation shift angle θ2 or more based on the signal from the hall element M1 in a state in which the cover 11 is opened and the drawer 60 is drawn out from the image forming position or when it is determined that the sheet P is removed based on a variation in the detected temperature of the temperature sensor SE5.

Conditions for resetting all jam errors including the winding jam error include a condition that the respective sheet sensors SE3, SE4 are OFF in addition to the condition of open/close of the cover 11 and the condition of insertion/drawing of the drawer 60.

The controller 100 includes a function of causing the nip state in the low nip state when it is determined that the jam error occurs. Specifically, in a case where the nip state is in the strong nip state when it is determined that the jam error occurs, the controller 100 stops the rotation of the first fixing member 81, stops the heater 110, and switches the nip state from the strong nip state to the low nip state. Specifically, the controller 100 executes switching from the strong nip state to the low nip state after stopping the rotation of the first fixing member 81 and stopping the heater 110.

Here, the rotation of the first fixing member 81 is stopped by stopping supply of electric current for driving to the motor M. The heater 110 is stopped by stopping supply of electric current to the heater 110. The switching from the strong nip state to the low nip state is executed by switching the position of the cam 340 of the switching mechanism 300.

The controller 100 further includes a function of cutting off a drive force from the motor M to the developer image forming portion when it is determined that the jam error occurs. Here, the cutting off of the drive force from the motor M to the developer image forming portion is executed by disengaging the clutch CL.

Next, the operation of the controller 100 will be explained in detail.

Figure 9:
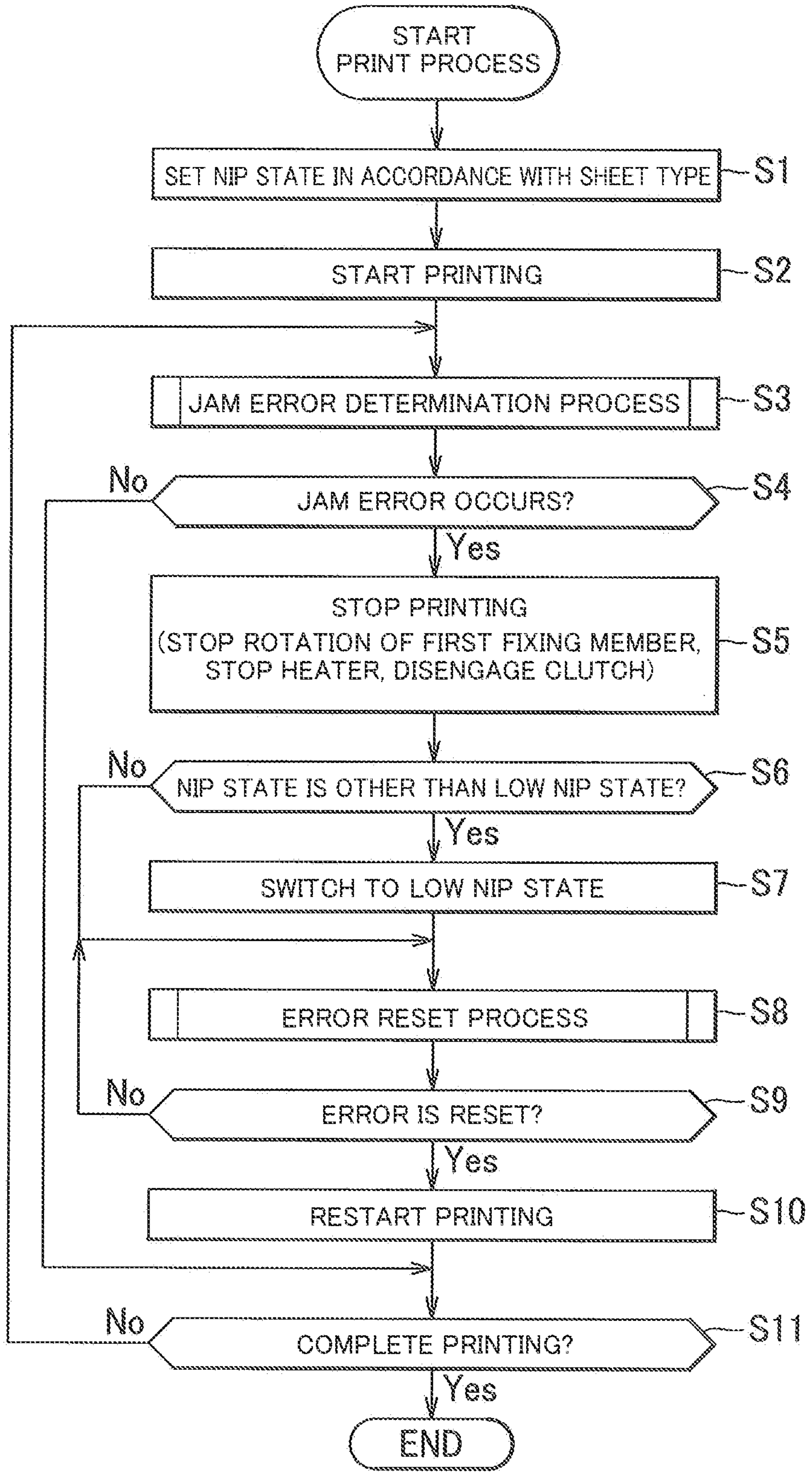
FIG. 9 is a flowchart illustrating a print process.

The controller 100 executes a print process illustrated in FIG. 9 when receiving a print command.

In the print process, the controller 100 sets the nip state in accordance with the type of the sheet P (S1). For example, in a case where the type of the sheet P is a sheet with a first thickness such as plain paper, the controller 100 causes the cam 340 to be located at the first cam position and in the strong nip state. In a case where the type of the sheet P is a sheet with a second thickness thicker than the first thickness such as thick paper, the controller 100 causes the cam 340 to be located at the second position and in the middle nip state. In a case where the type of the sheet P is a sheet with a third thickness thicker than the second thickness such as an envelope, the controller 100 causes the cam 340 to be located at the third cam position and in the low nip state.

After Step S1, the controller 100 starts printing (S2). After Step S2, the controller 100 executes a jam error determination process (S3). The jam error determination process will be described later.

After Step S3, the controller 100 determines whether the jam error occurs or not, specifically, whether it is determined that the jam error occurs in the jam error determination process or not (S4). When it is determined that the jam error occurs at Step S4 (Yes), the controller 100 stops printing (S5). Specifically, the controller 100 stops the rotation of the first fixing member 81, stops the heater 110, and disengages the clutch CL at Step S5.

After Step S5, the controller 100 determines whether the nip state is in a state other than the low nip state or not (S6). When it is determined that the nip state is in a state other than the low nip state, namely, in the middle nip state or the strong nip state (S6:Yes), the controller 100 drives the switching mechanism 300 and switches the nip state to the low nip state (S7). Specifically, the controller 100 drives the second motor 360 and pivots the cam 340 from the first cam position or the second cam position to the third cam position.

After Step S7, or when it is negatively determined at Step S6, the controller 100 executes an error reset process (S8). The error reset process will be described later.

After Step S8, the controller 100 determines whether the jam error is reset in the error reset process or not (S9). When it is determined that the jam error is not reset at Step S9 (S9:No), the controller 100 returns to the process of Step S8.

When it is determined that the jam error is reset at Step S9 (S9:Yes), the controller 100 restarts printing (S10). After Step S10, or when it is negatively determined at Step S4, the controller 100 determines whether printing is completed or not (S11).

When it is determined that the printing is not completed at Step S11 (S11:No), the controller 100 returns to the process of Step S3. When it is determined that the printing is completed at Step S11 (S11:Yes), the controller 100 ends the process.

Figure 10:
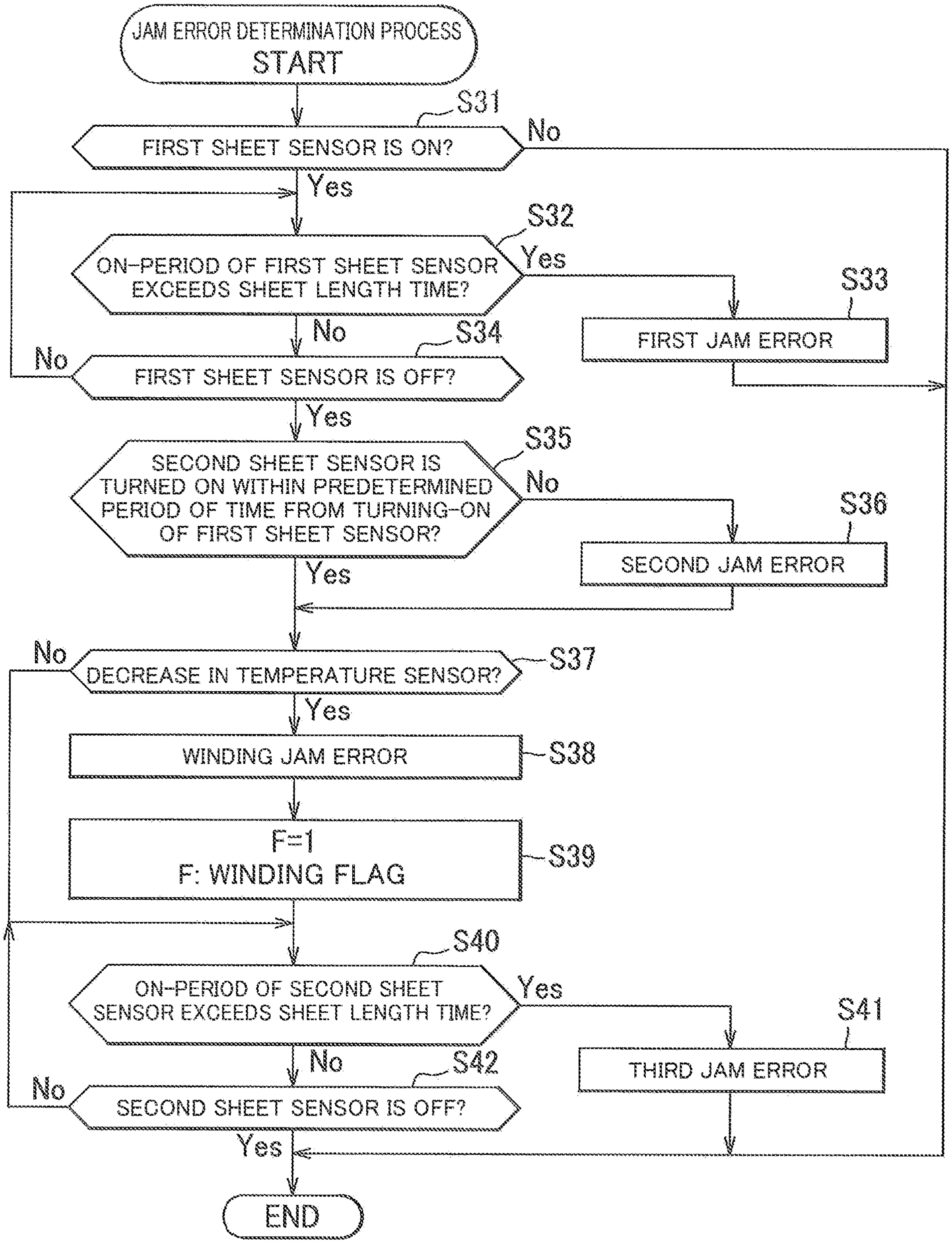
FIG. 10 is a flowchart illustrating a jam error determination process.

As illustrated in FIG. 10, the controller 100 first determines whether the first sheet sensor SE3 is turned on or not in the jam error determination process (S31). When it is determined that the first sheet sensor SE3 is not turned on at Step S31 (S31:No), the controller 100 ends the process.

When it is determined that the first sheet sensor SE3 is turned on at Step S31 (S31:Yes), the controller 100 determines whether an ON-period of the first sheet sensor SE3 exceeds the sheet length time or not (S32). When it is determined that the ON-period of the first sheet sensor SE3 exceeds the sheet length time at Step S32 (S32:Yes), the controller 100 determines that the first jam error occurs (S33) and ends the process.

When it is determined that the ON-period of the first sheet sensor SE3 does not exceed the sheet length time at Step S32 (S32:No), the controller 100 determines whether the first sheet sensor SE3 is turned off or not (S34).

When it is determined that the first sheet sensor SE3 is not turned off at Step S34 (S34:No), the controller 100 returns to the process of Step S32. When it is determined that the first sheet sensor SE3 is turned off at Step S34 (S34:Yes), the controller 100 determines whether the second sheet sensor SE4 is turned on within the predetermined period of time from the turning-on of the first sheet sensor SE3 or not (S35).

When it is determined that the second sheet sensor SE4 is not turned on within the predetermined period of time from the turning-on of the first sheet sensor SE3 at Step S35 (S35:No), the controller 100 determines that the second jam error occurs (S36). The controller 100 determines whether the detected temperature by the temperature sensor SE5 decreases or not (S37) when it is affirmatively determined at Step S35, or after Step S36. Specifically, the controller 100 determines whether the decrease amount of the detected temperature per the unit time is greater than the first predetermined amount or not at Step S37.

When it is determined that the detected temperature decreases at Step S37 (S37:Yes), the controller 100 determines that the winding jam error occurs (S38), and sets a winding flag F indicating that the sheet P has wound around the first fixing member 81 to “1” (S39). After Step S39, or when it is negatively determined at Step S37, the controller 100 determines whether the ON-period of the second sheet sensor SE4 exceeds the sheet length time or not (S40).

When it is determined that ON-period of the second sheet sensor SE4 exceeds the sheet length time at Step S40 (S40:Yes), the controller 100 determines that the third jam error occurs (S41) and ends the process. When it is negatively determined at Step S40, the controller 100 determines whether the second sheet sensor SE4 is turned off or not (S42).

When it is determined that the second sheet sensor SE4 is not turned off at Step S42 (S42:No), the controller 100 returns to the process of Step S40. When it is determined that the second sheet sensor SE4 is turned off at Step S42 (S42:Yes), the controller 100 ends the process.

Figure 11:
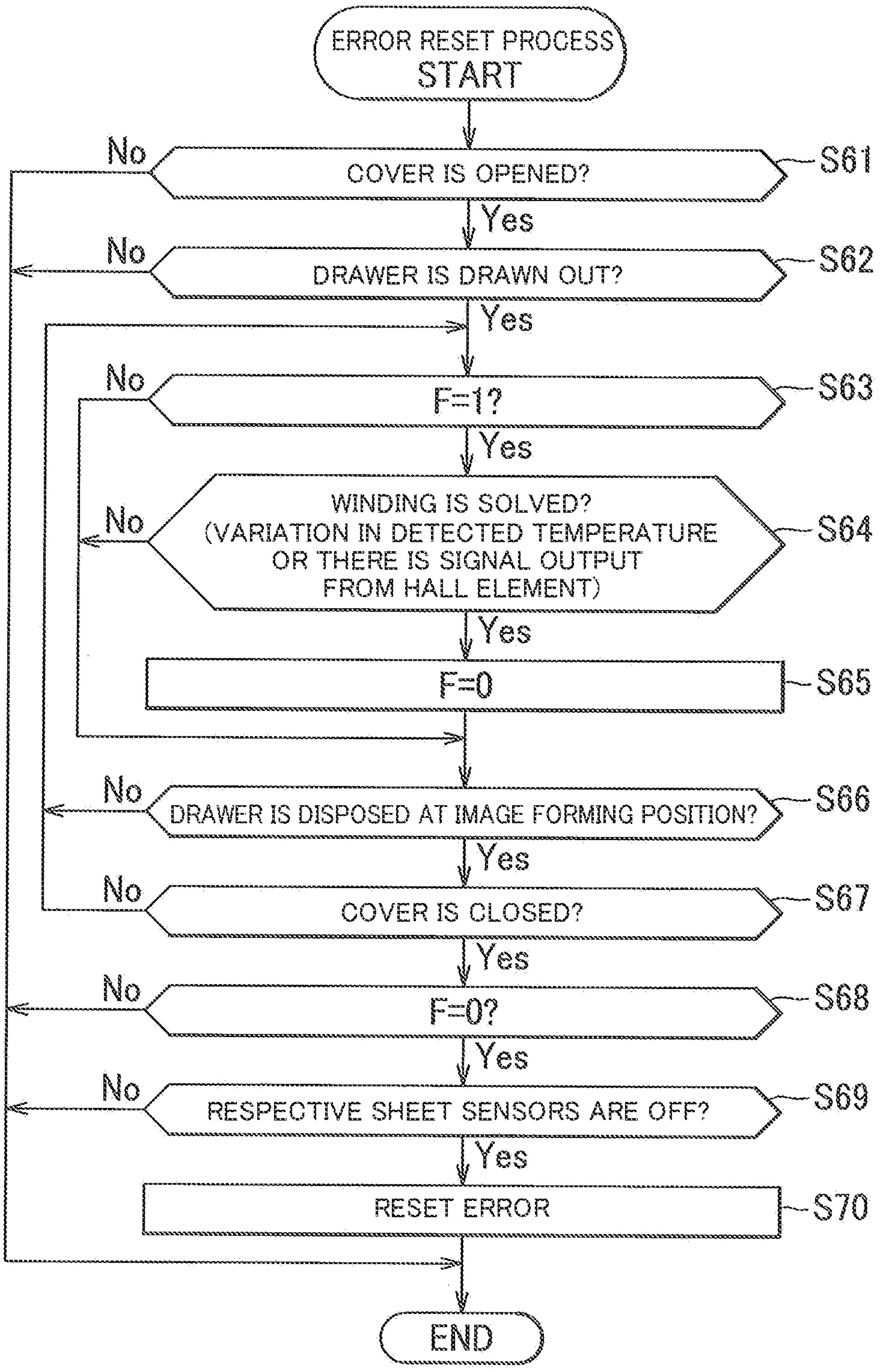
FIG. 11 is a flowchart illustrating an error reset process.

As illustrated in FIG. 11, the controller 100 first determines whether the cover 11 is opened or not based on the signal from the cover open/close sensor SE2 in the error reset process (S61). When it is determined that the cover 11 is not opened at Step S61 (S61:No), the controller 100 end the process without resetting the jam error.

When it is determined that the cover 11 is opened at Step S61 (S61:Yes), the controller 110 determines whether the drawer 60 is drawn out from the image forming position or not based on a connection state between the first contact CN1 and the second contact CN2 (S62). Specifically, the controller 100 determines whether there is a response from the in-housing temperature sensor SE1 provided at the drawer 60 or not, determining that the drawer 60 is drawn out from the image forming position when there is no response at Step S62. When it is determined that the drawer 60 is not drawn out at Step S62 (S62:No), the controller 100 ends the process without resetting the jam error.

When it is determined that the drawer 60 is drawn out at Step S62 (S62:Yes), the controller 100 determines whether the winding flag F is "1" or not (S63). When it is determined that F=1 at Step S63, the controller 100 determines whether winding of the sheet P around the first fixing member 81 is solved or not, namely, whether the sheet P having wound around the first fixing member 81 is removed or not based on a variation in the detected temperature by the temperature sensor SE5 or the signal from the hall element M1 (S64).

Specifically, the controller 100 determines that the winding is solved when determining that the decrease amount of the detected temperature per the unit time is greater than the second predetermined amount or when determining that the motor M is rotated by the rotation phase angle θ2 or more based on the signal from the hall element M1 at Step S64. The controller 100 sets the winding flag F to "0" (S65) when determining that the winding is solved at Step S64 (S64: Yes).

After Step S65, or when it is negatively determined at Step S64, the controller 100 determines whether the drawer 60 is disposed at the image forming position or not based on the connection state between the first contact CN1 and the second contact CN2 (S66). Specifically, the controller 100 determines whether there is the response from the in-housing temperature sensor SE1 provided at the drawer 60 or not at Step S66, and determines that the drawer 60 is disposed at the image forming position when there is the response.

When it is determined that the drawer 60 is not disposed at the image forming position at Step S66 (S66:No), the controller 100 returns to the process of Step S63. When it is determined that the drawer 60 is disposed at the image forming position at Step S66 (S66:Yes), the controller 100 determines whether the cover 11 is closed or not based on the signal from the cover open/close sensor SE2 (S67).

When it is determined that the cover 11 is not closed at Step S67 (S67:No), the controller 100 returns to the process of Step S63. When it is determined that the cover 11 is closed at Step S67 (S67:Yes), the controller 100 determines whether the winding flag F is "0" or not (S68).

When it is determined that F=0 at Step S68 (S68:Yes), the controller 100 determines whether the respective sheet sensors SE3, SE4 are OFF or not, thereby determining whether the sheet P that keeps the swing member of the first sheet sensor SE3 or the second sheet sensor SE4 in the tilted state is removed or not (S69). It is noted that the process at Step S69 is particularly effective when the first jam error or the third jam error occurs; however, the process is also effective when the second jam error or the winding jam error occurs because there is a case where the sheet P other than the sheet P causing respective errors is jammed in the state where the sheet P tilts the swing member.

When it is determined that the respective sheet sensors SE3, SE4 are OFF at Step S69 (S69:Yes), the controller 100 resets the jam error (S70) and ends the process. When it is negatively determined at Step S68, S69, the controller 100 ends the process without resetting the jam error.

Next, an example of the operation of the controller 100 is explained in detail.

As illustrated in FIG. 7A, when the sheet P has wound around the first fixing member 81 in printing, a distal end of the sheet P having wound around the first fixing member 81 comes close to the temperature sensor SE5 by the rotation of the first fixing member 81. When the distal end of the sheet P enters between the temperature sensor SE5 and the first fixing member 81, the detected temperature suddenly decreases as illustrated at the time t2 of FIG. 8. When the detected temperature suddenly decreases in this manner, the controller 100 determines that the winding jam error occurs in the jam error determination process illustrated in FIG. 10 (S37: Yes→S38).

When the occurrence of the winding jam error is determined as described above, the controller 100 affirmatively determines Step S4 of FIG. 9, stops rotation of the first fixing member 81, stops the heater 110 and disengages the clutch CL to thereby stop the printing (S5). Stopping the rotation of the first fixing member 81 suppresses the progress of folding of the sheet P and it is possible to keep the position of the distal end of the sheet P at a position close to the temperature sensor SE5.

It is possible to suppress wasteful heating of the sheet P by stopping the heater 110. Moreover, the developer image forming portion that becomes a load when rotating the motor M is disengaged from the motor M by disengaging the clutch CL.

After Step S5, the controller 100 switches the nip state from the strong nip state to the low nip state, for example, in the state where the nip state is in the strong nip state (S6: Yes→S7). The nip pressure between the first fixing member 81 and the second fixing member 82 is reduced by the above process; therefore, the user can easily pull out the sheet P from between the first fixing member 81 and the second fixing member 82.

When the winding jam error occurs and printing is stopped, the user opens the cover 11 and draws the drawer 60 out of the body housing 10 to take out the sheet P jammed inside the body housing 10. As a result of this, the controller 100 affirmatively makes determinations at Steps S61, S62 respectively in the error reset process of FIG. 11.

When the user enters a hand through the opening 10A of the body housing 10 and pulls out the sheet P jammed in the fixing device 80 as illustrated in FIG. 7A in a direction opposite to the conveying direction, the distal end of the sheet P comes off from between the temperature sensor SE5 and the first fixing member 81, as a result, the detected temperature of the temperature sensor SE5 suddenly decreases as illustrated at the time t3 of FIG. 8. When the detected temperature suddenly decreases as described above, the controller 100 determines that the winding is solved (S64:Yes) and sets the winding flag to "0" in the error reset process of FIG. 11 (S65).

Furthermore, the controller 100 determines that the winding is solved in a case where the condition relating to the signal from the hall element M1 is satisfied even when the condition of the detected temperature is not satisfied at Step S64. Specifically, the first fixing member 81 being in contact with the sheet P is rotated and the motor M is rotated by interlocking with the rotation of the first fixing member 81 as the user pulls out the sheet P. When the distal end of the sheet P comes off from the nip portion NP, the first fixing member 81 rotates by the rotation phase angle θ1 (=θ) or more and the motor M rotates by the rotation phase angle θ2 corresponding to θ1 or more.

The hall element M1 continues outputting the signal to the controller 100 while the motor M rotates; therefore, the controller 100 determines that the motor M rotates by the rotation phase angle θ2 or more when a period of time during which the signal is received from the hall element M1 becomes a predetermined period of time or more, and the controller 100 determines that the winding is solved. After the user pulls out the sheet P jammed in the fixing device 80, the user returns the drawer 60 to the image forming position and closes the cover 11 to thereby restart printing which has been stopped.

As a result of this, the controller 100 affirmatively makes determinations at Step S66, S67 respectively in the error reset process of FIG. 11. After that, the controller 100 determines whether the respective sheet sensors SE3, SE4 are OFF after affirmatively makes a determination at Step S68 (S69).

In a case where the sheet P is not jammed at positions of the respective sheet sensors SE3, SE4, the controller 100 affirmatively makes a determination at Step S69 and resets the winding jam error (S70). Accordingly, affirmative determination is made at Step S9 of FIG. 9 to thereby restart printing (S10).

According to the above, the following advantages can be obtained in the present embodiment.

The nip state is switched from the strong nip state to the low nip state when the jam error occurs in printing in the strong nip state; therefore, it is possible to easily pull out the sheet P between the first fixing member 81 and the second fixing member 82.

The rotation of the first fixing member 81 is stopped before switching from the strong nip state to the low nip state; therefore, it is possible to suppress difficulty in pulling out the sheet P due to the progress of folding of the sheet P. Moreover, the heater 100 is stopped before switching from the strong nip state to the low nip state; therefore, it is possible to suppress wasteful heating of the sheet P after the occurrence of the jam error.

The occurrence of the jam error is determined when the particular sheet P is not detected by the second sheet sensor SE4 within the predetermined period of time from the detection of the particular sheet P by the first sheet sensor SE3; therefore, it is possible to appropriately determine by the two sheet sensors SE3, SE4 that the second jam error occurring when the sheet P is stopped between the first sheet sensor SE3 and the second sheet sensor SE4.

The winding of the sheet P around the first fixing member 81 is determined by using the temperature sensor SE5 used for controlling the heat 110; therefore, it is possible to reduce costs as compared with the case in which the winding is determined by using, for example, sensors other than the temperature sensor. It is also possible to suppress multiple winding of the sheet P around the first fixing member 81, since the decrease in detected temperature can be determined when the sheet P reaches the position of the temperature sensor SE5.

The jam error is not reset unless the sheet P having wound around the first fixing member 81 is removed; therefore, it is possible to prevent the printing operation from being started while the sheet P is still wound around the first fixing member 81. It is also possible to positively determine that the winding is solved by the variation in the detected temperature.

The removal of the sheet P having wound around the first fixing member 81 is determined on condition that the motor M is rotated based on the signal from the hall element M1 in the state where electric current for driving is not supplied to the motor M; therefore, it is possible to positively determine that the winding is solved by the rotation of the motor M.

The nip portion NP is formed only by deformation of the first nip forming member N1 in the low nip state; therefore, a force necessary for pulling out the sheet P can be small and it is possible to pull out the sheet P easily.

Since the first nip forming member N1 and the second nip forming member N2 are spaced apart from each other in the conveying direction, the nip width in the conveying direction can be small in the low nip state and it is possible to reduce the resistance at the time of pulling out the sheet P.

Since the nip portion NP is formed by the softer first nip forming member N1 in the low nip state, it is possible to reduce the resistance at the time of pulling out the sheet P.

When the user pulls out the sheet P nipped between the first fixing member 81 and the second fixing member 82, the first fixing member 81 and the motor M are rotated by an external force; therefore, the hall element M1 detects the rotation of the motor M. When the sheet P nipped between the first fixing member 81 and the second fixing member 82 is not pulled out, the first fixing member 81 and the motor M are not rotated; therefore, the hall element M1 does not detect the rotation of the motor M. Accordingly, the controller 100 does not reset the winding jam error, since the hall element M1 does not detect the rotation of the motor M when the sheet P remains winding around the first fixing member 81, it is possible to prevent the printing from being started in the state where the sheet P remains winding around the first fixing member 81.

The rotation of the motor Mat the time of winding jam error is detected by using the hall element M1 used for controlling driving of the motor M; therefore, it is possible to reduce costs as compared with, for example, the case where other sensors not used for controlling driving of the motor are used.

Since the low nip state, namely, the state in which the first fixing member 81 is in contact with the second fixing member 82 is formed when the winding jam error occurs, it is possible to appropriately rotate the first fixing member 81 by the pull-out of the sheet P as compared with, for example, a method in which a space is made between the first fixing member 81 and the second fixing member 82 when the winding jam error occurs.

When the sheet P has wound around the first fixing member 81, the developer image forming portion that becomes a load when rotating the motor M is disengaged from the motor M by cutting off the drive force from the motor M to the developer image forming portion; therefore, it is possible to reduce the force necessary for pulling out the sheet P from between the first fixing member 81 and the second fixing member 82.

Since the configuration in which the winding jam error is reset when it is determined that the motor M is rotated by the rotation phase angle θ2 or more is adopted, the winding jam error is reset after the distal end of the sheet P having wound around the first fixing member 81 moves from the temperature sensor SE5 to the nip portion NP and the sheet P is pulled out from the nip portion NP; therefore, it is possible to positively prevent the printing from being started while the sheet P remains winding around the first fixing member 81.

The rotation of the motor M is determined in the state where the cover 11 is opened, thereby determining whether the sheet is pulled out from between the first fixing member 81 and the second fixing member 82 more positively.

It is noted that the present disclosure is not limited to the above embodiment but can be used in various manners illustrated as follows. In the following description, the same symbols are given to members having approximately the same structures as those in the above embodiment, and the explanation thereof is omitted.

The hall element M1 is illustrated as the rotation detection member in the above embodiment; however, the present disclosure is not limited to this. The rotation detection member may be, for example, a rotary encoder or the like that detects rotation of the motor.

The winding is determined based on the detected temperature of the temperature sensor SE5 in the above embodiment; however, the present disclosure is not limited to this. It is also preferable that the winding is determined by, for example, a sensor different from the temperature sensor.

Whether the winding is solved or not is determined based on the detected temperature of the temperature sensor SE5 and the signal from the hall element M1 in the above embodiment; however, the present disclosure is not limited to this. It is also preferable to determine whether the winding is solved or not only based on the detected temperature of the temperature sensor or to determine whether the winding is solved or not only based on the signal from the hall element.

The nip state is switched in three stages among the strong nip state, the middle nip state, and the low nip state in the above embodiment; however, the present disclosure is not limited to this. It is also preferable to switch the nip state in two stages between the strong nip state and the low nip state as well as to switch the nip state in four or more stages among states including the strong nip state and the long nip state.

The determination of the occurrence of the jam error is not limited to the above embodiment. For example, the occurrence of the jam error may be determined based on a period of time starting from a time when the sheet is picked up to a time when the first sheet sensor is turned on The transmission of the drive force from the motor M to the developer image forming portion is cut off by the clutch CL in the above embodiment; however, the present disclosure is not limited to this. For example, the transmission of the drive force from the motor to the developer image forming portion may be cut off by a pendulum gear or a planetary gear mechanism.

The present disclosure is applied to the color printer 1 in the above embodiment; however, the present disclosure is not limited to this. The present disclosure may be applied to other image forming apparatuses, for example, a monochrome printer, a copy machine, a multifunction peripheral, and the like.

The controller 100 is configured to execute low-nip process in the case where the sheet P is an envelope in the above embodiment; however, it is also preferable to execute strong-nip process, middle-nip process, and the low-nip process regardless of the type of the sheet P. The strong-nip process, the middle-nip process, and the low-nip process may be selectively executed under a particular condition regardless of the type of the sheet.

The configuration in which the second fixing member 82 is moved with respect to the first fixing member 81 is adopted in the above embodiment; however, the present disclosure is not limited to this. It is also preferable to move the first fixing member with respect to the second fixing member.

Any type of heater, which is, for example, a carbon heater can be adopted. A plurality of heaters may be used.

The nip forming member is formed by the pad and the fixing plate in the above embodiment; however, the present disclosure is not limited to this. The nip forming member may be formed, for example, only by the pad.

The second spring 330 and the cam follower 350 are provided in the above embodiment; however, the present disclosure is not limited to this. It is not always necessary to provide the second spring and the cam follower. That is, a configuration in which the arm body can be directly pressed by the cam may be adopted.

The first spring is the extension coil spring and the second spring is the compression coil spring in the above embodiment; however, the present disclosure is not limited to this. For example, the first spring may be the compression coil spring and the second spring may be the extension coil spring.

The urging forces of the first spring 320 and the second spring 330 are applied to the second fixing member 82 through the arm 310 in the above embodiment; however, the present disclosure is not limited to this. For example, the urging forces of the first spring 320 and the second spring 330 may be directly applied to the second fixing member.

The first spring and the second spring are not limited to the above coil springs but, for example, a torsion spring, a plate spring, and the like may be used.

As the method of heating the first fixing member by the heater, for example, an external heating method in which the heater is disposed outside the first fixing member to heat the outer circumferential surface of the first fixing member and an IH (Induction Heating) method may be adopted.

The second fixing member 82 is moved by the pivotable cam 340 in the above embodiment; however, the present disclosure is not limited to this. For example, the second fixing member may be moved by a linear cam that is linearly movable, or the second fixing member may be moved by advancing and retracting a rod of an air cylinder.

The first pad P1 and the second pad P2 are made of rubber in the above embodiment; however, the present disclosure is not limited to this. The pads may be made of, for example, rigid materials such as resin or metal which are not elastically deformed at the time of being pressurized.

The configuration in which the photoconductor drums, the chargers, and the like are provided in the developer image forming portion is adopted in the above embodiment; however, the present disclosure is not limited to this. The developer image forming portion may include, for example, belt-shaped photoconductors, charging rollers, and so on.

Respective components explained in the above embodiment and modification examples may be arbitrarily combined to be achieved.

What is claimed is:

1. An image forming apparatus, comprising:

a first fixing member having a roller;

a second fixing member including a belt, a first nip forming member and a second nip forming member located downstream of the first nip forming member in a conveying direction of a sheet, the belt being nipped between the first fixing member and the second fixing member;

a heater configured to heat the first fixing member;

a switching mechanism capable of switching a nip state of the first fixing member and the second fixing member between (i) a first nip state in which the belt is nipped between each of the first nip forming member and the second nip forming member, and the first fixing member, and (ii) a second nip state in which the belt is nipped between the first nip forming member and the first fixing member in a state in which the belt is not nipped between the second nip forming member and the first fixing member; and a controller configured to execute:

stopping rotation of the first fixing member and stopping the heater when a jam error occurs in the first nip state, the jam error being an error in which the sheet stops while image forming; and switching the nip state from the first nip state to the second nip state when a jam error occurs in the first nip state after executing stopping the rotation of the first fixing member.

2. The image forming apparatus according to claim 1, further comprising:

a first sheet sensor configured to detect the sheet; and a second sheet sensor configured to detect the sheet, the second sheet sensor being located downstream of the first sheet sensor in the conveying direction of the sheet, wherein the controller is configured to determine that the jam error occurs when a particular sheet is not detected by the second sheet sensor within a predetermined period of time from a time when the particular sheet is detected by the first sheet sensor.

3. The image forming apparatus according to claim 1, further comprising:

a temperature sensor configured to detect a temperature of the first fixing member, the temperature sensor being located within a width of a minimum sheet fixed by the first fixing member and the second fixing member, wherein the controller is configured to determine that the sheet has wound around the first fixing member when the detected temperature by the temperature sensor indicates a decrease of the temperature of the first fixing member.

4. The image forming apparatus according to claim 3, wherein the controller is configured to reset the jam error on condition that a variation in the detected temperature occurs after it is determined that the sheet has wound around the first fixing member.

5. The image forming apparatus according to claim 1, further comprising:

a motor configured to rotate the first fixing member; and a rotation detection member configured to detect rotation of the motor, the rotation detection member having a hall element or a rotary encoder, wherein the controller is configured to reset the jam error in which the sheet has wound around the first fixing member on condition that, based on a signal from the rotation detection member, the motor to which no electric current for driving is supplied is rotated by a predetermined phase angle.

6. The image forming apparatus according to claim 1, further comprising:

a spring configured to urge the second fixing member to the first fixing member, wherein the urging force of the spring is not applied to the first nip forming member in the second nip state.

7. The image forming apparatus according to claim 1, wherein the first nip forming member and the second nip forming member are spaced apart from each other in the conveying direction of the sheet.

8. The image forming apparatus according to claim 1, wherein the first nip forming member is softer than the second nip forming member.

9. An image forming apparatus, comprising:

a fixing roller;

a belt;

a first pad;

a second pad located downstream of the first pad in a conveying direction of a sheet:

a heater configured to heat the first fixing roller;

a switching mechanism capable of switching a nip state between (i) a first nip state in which the first pad and the second pad urge the belt toward the fixing roller, and (ii) a second nip state in which the first pad urges the belt toward the fixing roller, and the second pad does not urge the belt toward the fixing roller; and a controller configured to execute:

stopping rotation of the fixing roller and stopping the heater when a jam error occurs in the first nip state, the jam error being an error in which the sheet stops while image forming; and switching the nip state from the first nip state to the second nip state after executing stopping the rotation of the first fixing roller.

10. The image forming apparatus according to claim 9, further comprising:

a first sheet sensor configured to detect the sheet; and a second sheet sensor configured to detect the sheet, the second sheet sensor being located downstream of the first sheet sensor in the conveying direction of the sheet, wherein the controller is configured to determine that the jam error occurs when a particular sheet is not detected by the second sheet sensor within a predetermined period of time from a time when the particular sheet is detected by the first sheet sensor.

11. A method for controlling an image forming apparatus, the image forming apparatus comprising:

a first fixing member;

a belt;

a first nip forming member configured to cooperate with the first fixing member to nip the belt therebetween;

a second nip forming member located downstream of the first nip forming member in a conveying direction of a sheet and configured to cooperate with the first fixing member to nip the belt therebetween;

a heater configured to heat the first fixing member;

wherein a nip state is switched between (a) a first nip state in which the belt is nipped between each of the first nip forming member and the second nip forming member, and the first fixing member, and (ii) a second nip state in which the belt is nipped between the first nip forming member and the first fixing member in a state in which the belt is not nipped between the second nip forming member and the first fixing member, the method comprising:

executing stopping rotation of the first fixing member and stopping the heater when a jam error occurs in the first nip state, the jam error being an error in which the sheet stops while image forming; and switching the nip state from the first nip state to the second nip state after executing stopping the rotation of the first fixing member.

12. The image forming apparatus according to claim 1, further comprising a holder holding the first nip forming member and the second nip forming member, wherein the switching mechanism is configured to move the holder in a predetermined direction, and wherein a distal end of the first nip forming member is closer to the first fixing member than a distal end of the second nip forming member in the predetermined direction.

13. The image forming apparatus according to claim 1, further comprising:

a photoconductor drum;

a motor configured to drive the roller and the photoconductor drum; and a transmission mechanism configured to transmit a drive force from the motor to the photoconductor drum, wherein the transmission mechanism is configured to cut off transmission of the driving force from the motor to the photoconductor drum when the jam error occurs.

14. The image forming apparatus according to claim 9, further comprising a holder holding the first pad and the second pad, wherein the switching mechanism is configured to move the holder in a predetermined direction, and wherein a distal end of the first pad is closer to the fixing roller than a distal end of the second pad in the predetermined direction.

15. The image forming apparatus according to claim 9, further comprising:

a photoconductor drum;

a motor configured to drive the fixing roller and the photoconductor drum; and a transmission mechanism configured to transmit a drive force from the motor to the photoconductor drum, wherein the transmission mechanism is configured to cut off transmission of the driving force from the motor to the photoconductor drum when the jam error occurs.

16. The method according to claim 11, wherein the image forming apparatus further comprises a holder holding the first nip forming member and the second nip forming member, wherein the switching mechanism is configured to move the holder in a predetermined direction, and wherein a distal end of the first nip forming member is closer to the first fixing member than a distal end of the second nip forming member in the predetermined direction.

17. The method according to claim 11, wherein the image forming apparatus further comprises:

a photoconductor drum;

a motor configured to drive a roller of the first fixing member and the photoconductor drum; and a transmission mechanism configured to transmit a drive force from the motor to the photoconductor drum, wherein the transmission mechanism is configured to cut off transmission of the driving force from the motor to the photoconductor drum when the jam error occurs.

* * * * *